United States Patent
Kenthapadi et al.

(10) Patent No.: US 10,552,741 B1
(45) Date of Patent: Feb. 4, 2020

(54) COMPUTING SMOOTHED POSTERIOR DISTRIBUTION OF CONFIDENTIAL DATA

(71) Applicant: Microsoft Technology Licensing, LLC, Redmond, WA (US)

(72) Inventors: Krishnaram Kenthapadi, Sunnyvale, CA (US); Stuart MacDonald Ambler, Longmont, CO (US); Liang Zhang, Fremont, CA (US); Deepak Agarwal, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 555 days.

(21) Appl. No.: 15/401,728

(22) Filed: Jan. 9, 2017

(51) Int. Cl.
  *G06N 3/12* (2006.01)
  *G06F 21/62* (2013.01)
  *G06N 20/20* (2019.01)
  *G06F 16/2455* (2019.01)
  *G06N 20/00* (2019.01)
  *G06F 16/25* (2019.01)

(52) U.S. Cl.
  CPC ....... *G06N 3/126* (2013.01); *G06F 16/24554* (2019.01); *G06F 16/258* (2019.01); *G06F 21/6254* (2013.01); *G06N 20/00* (2019.01)

(58) Field of Classification Search
  CPC .. G06N 3/126; G06N 20/00; G06F 16/24554; G06F 16/258; G06F 21/6254
  See application file for complete search history.

(56) References Cited

U.S. PATENT DOCUMENTS

2018/0173893 A1* 6/2018 Rose ................... G06F 21/6254

OTHER PUBLICATIONS

Zhou, "A Smoothing Approach for Masking Spatial Data", Institute of Mathematical Statistics, vol. 4, p. 145-1475 (Year: 2010).*
McDonald, "Handbook of Biological Statistics", 2014, Sparky House Publishing, p. 1-305 (Year: 2014).*
Korn, "Strategies for Modeling Loss Development: Curve Fitting, Credibility, and Layer Adjustments" vol. 11 issue 1-2 p. 95-117 (Year: 2002).*
Xhou, "A Smoothing Approach for Masking Spatial Data", institute of Mathematical statistics, vol. 4, p. 145-1475 (Year: 2010).*
Butler, "Measurement and prediction of access control policy evaluation performance", IEEE, vol. 12, No. 4, p. 526-539 (Year: 2015).*
Cawi, "The lognormal Distance Model", SARBayes, 2014 (Year: 2014).*

* cited by examiner

*Primary Examiner* — Alan Chen
*Assistant Examiner* — Van C Mang
(74) *Attorney, Agent, or Firm* — Schwegman Lundberg & Woessner, P.A.

(57) ABSTRACT

In an example, a set of cohort types and an anonymized set of confidential data data values for a plurality of cohorts having cohort types in the set of cohort types are obtained. Then it is determined, from a set of candidate data transformations, a best fitting data transformation for the anonmyized set of confidential data data values. The anonymized set of confidential data data values is transformed using the best fitting data transformation. Optimal smoothing parameters are computed for each cohort type. Then, for each cohort in the set of cohort types having a small sample size, a best parent for the cohort is determined and a posterior distribution for the cohort is determined based on the best parent for the cohort and the optimal smoothing parameters for a cohort type for the cohort.

20 Claims, 19 Drawing Sheets

US 10,552,741 B1

COMPUTING SMOOTHED POSTERIOR DISTRIBUTION OF CONFIDENTIAL DATA

TECHNICAL FIELD

The present disclosure generally relates to computer technology for solving technical challenges in collection and maintenance of confidential data in a computer system. More specifically, the present disclosure relates to computing a smoothed posterior distribution of confidential data in a computer system.

BACKGROUND

In various types of computer systems, there may be a need to collect, maintain, and utilize confidential data. In some instances, users may be reluctant to share this confidential information over privacy concerns. These concerns extend not only to pure security concerns, such as concerns over whether third parties such as hackers may gain access to the confidential data, but also to how the computer system itself may utilize the confidential data. With certain types of data, users providing the data may be somewhat comfortable with uses of the data that maintain anonymity, such as the confidential data merely being used to provide broad statistical analysis to other users.

One example of such confidential data is salary/compensation information. It may be desirable for a service such as a social networking service to entice its members to provide information about their salary or other work-related compensation in order to provide members with insights as to various metrics regarding salary/compensation, such as an average salary for a particular job type in a particular city. There are technical challenges encountered, however, in ensuring that such confidential information remains confidential and is only used for specific purposes, and it can be difficult to convince members to provide such confidential information due to their concerns that these technical challenges may not be met. Additionally, there is commonly a trade-off between the quality of the statistical insights gathered from confidential data submitted (such as from selecting groupings of a larger number of samples) and the coverage (such as selecting more groupings but from a smaller number of samples).

BRIEF DESCRIPTION OF THE DRAWINGS

Some embodiments of the technology are illustrated, by way of example and not limitation, in the figures of the accompanying drawings.

DETAILED DESCRIPTION

The present disclosure describes, among other things, methods, systems, and computer program products. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, an architecture is provided that gathers confidential information from users, tracks the submission of the confidential information, and maintains and utilizes the confidential information in a secure manner while ensuring that the confidential information is accurate and reliable.

Figure 1:
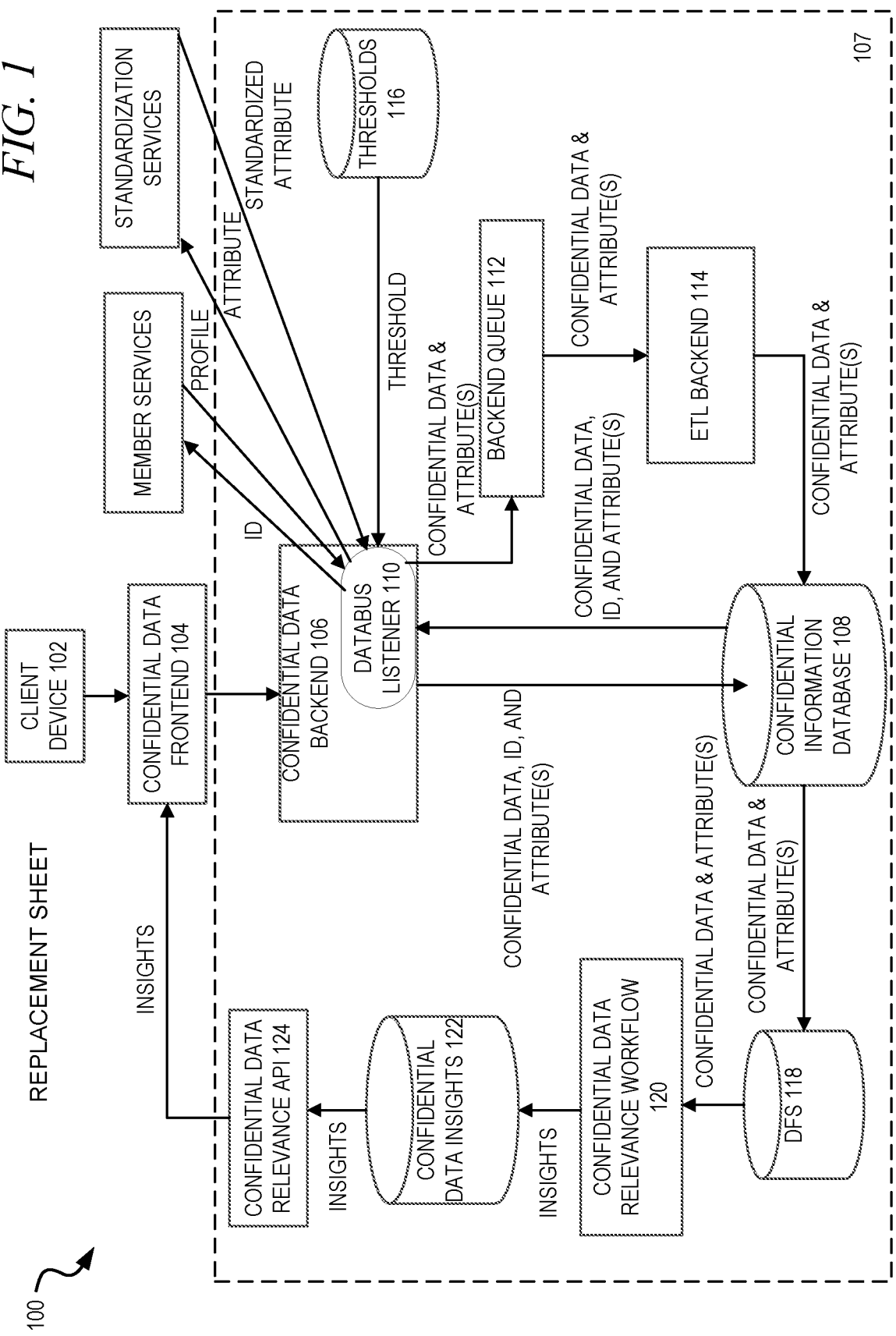
FIG. 1 is a block diagram illustrating a confidential data collection, tracking, and usage system, in accordance with an example embodiment.

FIG. 1 is a block diagram illustrating a confidential data collection, tracking, and usage system 100, in accordance with an example embodiment. A client device 102 may utilize a confidential data frontend 104 to submit confidential information to a confidential data backend 106. In some example embodiments, the confidential data backend 106 is located on a server-side or cloud platform 107 while the confidential data frontend 104 is directly connected to or embedded in the client device 102. However, in some example embodiments, the confidential data frontend 104 is also located on the server-side or cloud platform 107.

There may be various different potential implementations of the confidential data frontend 104, depending upon the type and configuration of the client device 102. In an example embodiment, the confidential data frontend 104 may be a web page that is served to a web browser operating on the client device 102. The web page may include various scripts, such as JavaScript code, in addition to Hypertext Markup Language (HTML) and Cascading Style Sheets (CSS) code designed to perform various tasks that will be described in more detail below. The web page may be served in response to the user selecting a link in a previous communication or web page. For example, the link may be displayed in an email communication to the user, or as part of a feed section of the user's social networking service member page. This allows the entity operating the confidential data collection, tracking, and usage system 100 to selectively target users to request that they submit confidential information. For example, the entity may determine that there is a need to obtain more salary information for users from Kansas and then may send out communications to, or cause the social networking service to alter feeds of, users in a manner that allows the users to select the link to launch the confidential data frontend 104.

In another example embodiment, the confidential data frontend 104 may be built into an application installed on the client device 102, such as a standalone application running on a smartphone. Again this confidential data frontend 104 is designed to perform various tasks that will be described in more detail below.

One task that the confidential data frontend 104 may be designed to perform is the gathering of confidential data from a user of the client device 102. Another task that the confidential data frontend 104 may be designed to perform is to display insights from confidential data contributed by other users. In order to incentivize users to provide certain types of confidential data, in an example embodiment, insights from the confidential data contributed by other users are provided in response to the user contributing his or her own confidential data. As will be described in more detail, a mechanism to ensure that the contribution of confidential data is tracked is provided.

Once the confidential data is received from the user, the confidential data frontend 104 may transmit the confidential data along with an identification of the user (such as a member identification reflecting the user's account with a social networking service) to the confidential data backend 106. In an example embodiment, this may be performed via, for example, a REST Application Program interface (API).

The confidential data, along with the identification of the user, may be stored in a submission table by the confidential data backend 106 in a confidential information database 108. In some example embodiments, this submission table may be encrypted in order to ensure security of the information in the submission table. Furthermore, in some example embodiments, the confidential data stored in the submission table may be encrypted using a different key than the identifying information in the submission table. This encryption will be described in more detail below.

In another example embodiment, a random transaction number is generated for each confidential data submission. This random transaction number is stored with the identifying information in one table, and then stored with the confidential data in another table, with each table encrypted separately using a different key. In either this example embodiment or the previous example embodiment, encrypting the identifying information separately from the confidential data (either in one table or in separate tables) provides added security against the possibility that a malicious user could gain access to one or the other. In other words, even if a malicious user gained access to the identifying information by, for example, hacking the encryption used to encrypt the identifying information, that would not allow the malicious user to gain access to the confidential data corresponding to the identifying information, and vice versa. In an example embodiment, the encryption mechanism used is one that is non-deterministic, such that the same information encrypted twice would produce different results in each encryption. In another example embodiment, the transaction number itself is also encrypted, thereby preventing even the act of joining separate tables containing the identifying information and the confidential data.

In an example embodiment, a submission table may also be able to track when submissions were made by users. As such, the submission table may include additional columns, such as, for example, a submission identification, an identification of the user who made the submission, an encryption key for the submission, and timestamp information about when the submission was made. The submission table may then be utilized by the confidential data backend 106 to determine, for example, when to share insights from submissions from other users to a particular user. If, for example, the user has previously submitted confidential data and has done so recently (e.g., within the last year), then the confidential data backend 106 may indicate to the confidential data frontend 104 that it should share insights from confidential data from other users with this particular user.

There may be other methods than those described above for determining eligibility of a user for receiving insights from submissions from other users. For example, a predicate expressed in terms of one or more attributes may need to be satisfied in order to receive the insights, such as particular demographic or profile-based attributes. These attributes can include any such attribute, from location to title, to level of skill, to social networking service activities or status (e.g., about to transition from being an active member to an inactive member), to transactional attributes (e.g., purchased a premium subscription).

Additionally, any combination of the above factors can be used to determine whether the user is eligible for receiving insights from submissions from other users.

Furthermore, the submission table may also include one or more attributes of the user that made the submission. These attributes may be attributes that can be useful in determining a slice to which the user belongs. Slices will be described in more detail below, but generally involve a segment of users sharing common attributes, such as titles, locations, educational levels, and the like. It should be noted that it is not necessary for these attributes to be stored in the submission table. Since an identification of the user is available in the submission table, it may be possible to retrieve the attributes for the user on an as-needed basis, such as by querying a social networking service with the user identification when needed.

A databus listener 110 detects when new confidential data is added to the confidential information database 108 and triggers a workflow to handle the new confidential data. First, the databus listener 110 queries a thresholds data store 116 to determine if one or more thresholds for anonymization have been met. Specifically, until a certain number of data points for confidential data have been met, the confidential data collection, tracking, and usage system 100 will not act upon any particular confidential data data point. As will be described in more detail later, these thresholds may be created on a per-slice basis. Each slice may define a segment of users about which insights may be gathered based on data points from confidential data submitted by users in the slice. For example, one slice may be users with the title "software engineer" located in the "San Francisco Bay Area." if, for example, the confidential data is compensation information, then it may be determined that in order to gain useful insights into the compensation information for a particular title in a particular region, at least ten data points (e.g., compensation information of ten different users) are needed. In this case, the threshold for "software engineer" located in "San Francisco Bay Area" may be set at ten. The databus listener 110, therefore, is designed to retrieve the confidential data added to the confidential information database 108, retrieve the threshold for the slice corresponding to attributes of the user (as stored, for example, in the submission table in the confidential information database 108 or retrieved at runtime from a social networking service), determine if the new data point(s) cause the threshold for the corresponding slice to be exceeded, and, if so, or if the threshold had already been exceeded, insert the data in a backend queue 112 for extract, transform, and load (ETL) functions.

In an example embodiment, the thresholds data store 116 contains not just the thresholds themselves but also a running count of how many data points have been received for each slice. In other words, the thresholds data store 116 indicates how close the slice is to having enough data points with which to provide insights. The databus listener 110 may reference these counts when making its determination that a newly submitted data point causes a threshold to be exceeded. Running counts of data points received for each slice are updated in the thresholds data store 116 by the confidential data backend 106.

Since the databus listener 110 only transfers data points for a particular slice to the backend queue 112 once the threshold for that slice has been exceeded, the confidential data data points corresponding to that slice may need to be retrieved from the confidential information database 108 once the threshold is determined to be exceeded. For example, if, as above, the threshold for a particular slice is ten data points, the first nine data points received for that slice may simply be left in the confidential information database 108 and not sent to the backend queue 112. Then, when the tenth data point for the slice is stored in the confidential information database 108, the databus listener 110 may determine that the threshold has been exceeded and retrieve all ten data points for the slice from the confidential information database 108 and send them to the backend queue 112 for processing.

It should be noted that the information obtained by the databus listener 110 from the confidential information database 108 and placed in the backend queue 112 is anonymized. In an example embodiment, no identification of the users who submitted the confidential data is provided to the backend queue 112. Indeed, in some example embodiments, the information provided to the backend queue 112 may simply be the confidential data itself and any information needed in order to properly group the confidential data in one or more slices. For example, if slices are designed to group user confidential data based only on user title, location, and years of experience, other attributes for the user that might have been stored in the confidential information database 108, such as schools attended, may not be transferred to the backend queue 112 when the confidential data tied to those attributes is transferred to the backend queue 112. This further helps to anonymize the data, as it makes it more difficult for people to be able to deduce the identity of a user based on his or her attributes.

It should also be noted that any one piece of confidential data may correspond to multiple different slices, and thus the databus listener 110 may, in some example embodiments, provide the same confidential data to the backend queue 112 multiple times. This can occur at different times as well, because each of the slices may have its own threshold that may be transgressed at different times based on different counts. Thus, for example, compensation data for a user in the "San Francisco Bay Area" with a job title of "software developer" and a school attended as "Stanford University" may be appropriately assigned to one slice of software developers in the San Francisco Bay Area, a slice of Stanford University alums, and a slice of software developers in the United States. All slices may have their own thresholds and counts from confidential data from other users, who may or may not have complete overlap with these three slices.

An ETL backend 114 acts to extract, transform, and load the confidential data to anonymize and group it and place it back in the confidential information database 108 in a different location from that where it was stored in non-anonymized form. It should be noted that in some example embodiments, the anonymizati on described above with respect to the databus listener 110 may actually be performed by the ETL backend 114. For example, the databus listener 110 may send non-anonymized confidential data along with all attributes to the backend queue 112, and it may be the ETL backend 114 that reviews this data and discards certain elements of it to anonymize it.

In an example embodiment, the confidential information is stored in encrypted format in the confidential information database 108 when the databus listener 110 sends it to the backend queue 112. As such, one function of the ETL backend 114 is to decrypt the confidential information. Encryption and decryption of the confidential data will be discussed in more detail below.

The ETL backend 114 writes the anonymized confidential data and slice information into an ETL table corresponding to the slice in the confidential information database 108. As described earlier, this ETL table may be stored in a different location than that in which the confidential data was stored initially, such as the submission table described earlier.

At a later time, and perhaps using a batch or other periodic process, the information from the ETL table may be loaded in a distributed file system (DFS) 118. A confidential data relevance workflow 120 may then extract relevant information from the DFS 118 and provide one or more insights into the relevant information in a confidential data insights data store 122. A confidential data relevance API 124 may then be utilized to provide insights from the confidential data insights data store 122 to the confidential data frontend 104, which can then display them to a user. As described earlier, these insights may be provided only on a "give-to-get" basis, namely that only users who provide confidential information (and/or have provided it recently) can view insights.

Figure 2A:
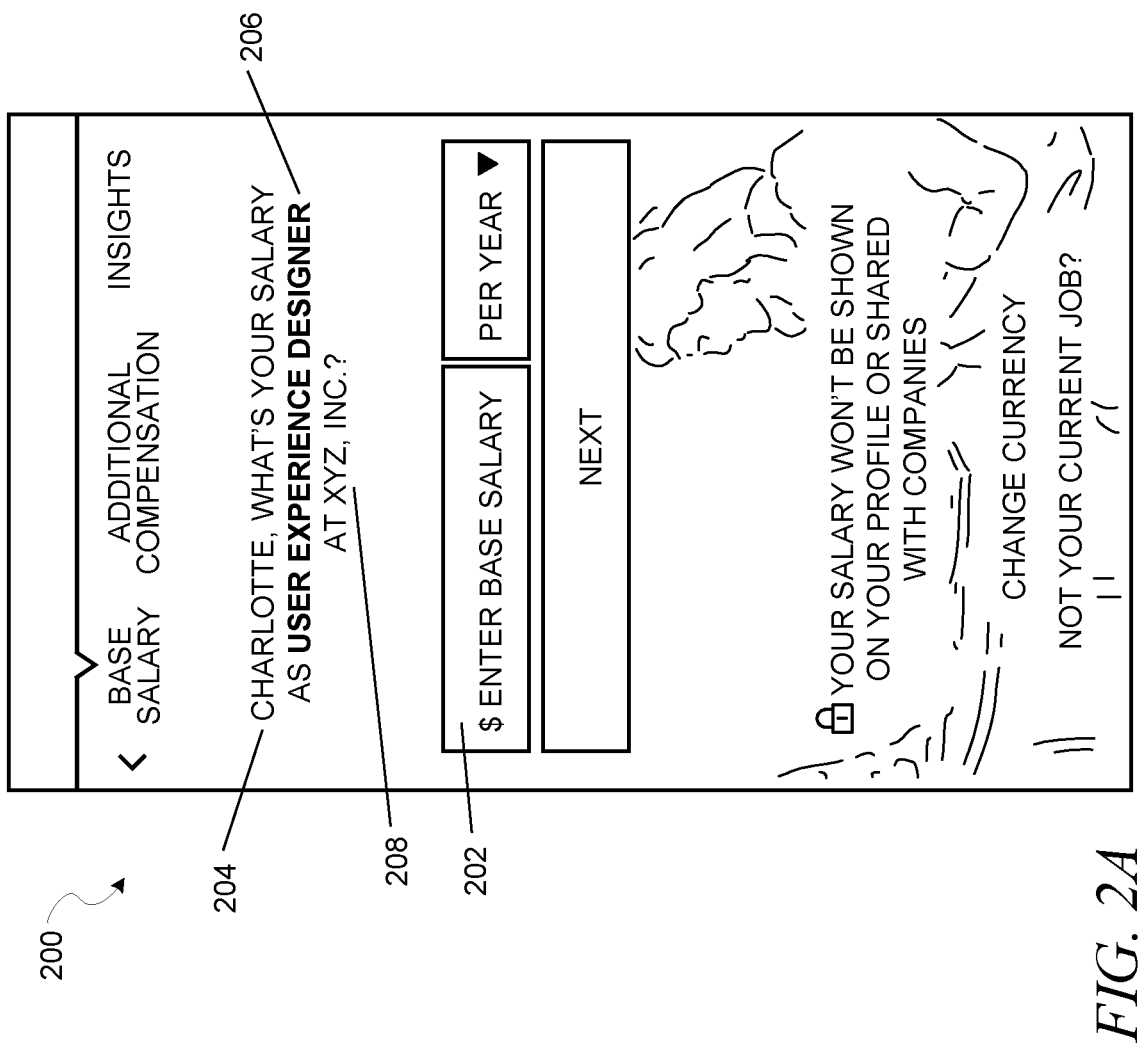
FIGS. 2A-2C are screen captures illustrating an example of a user interface provided by a confidential data frontend, in accordance with an example embodiment.
Figure 2B:
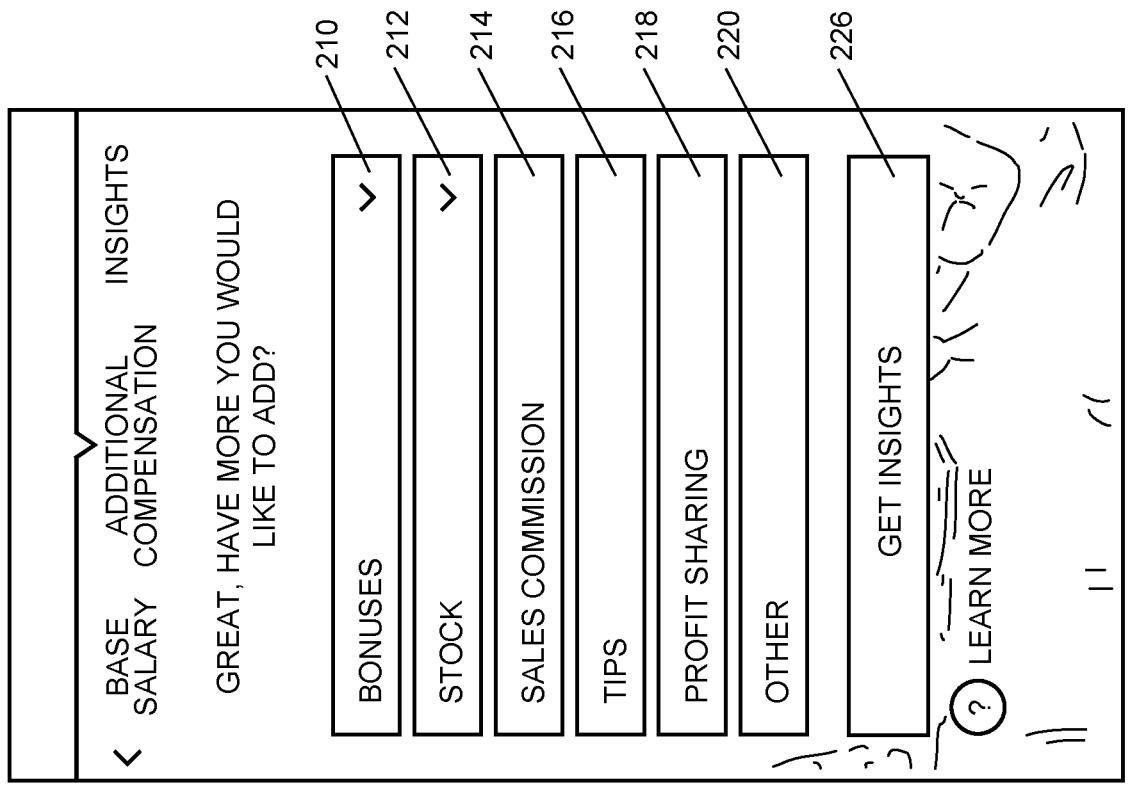
Figure 2C:
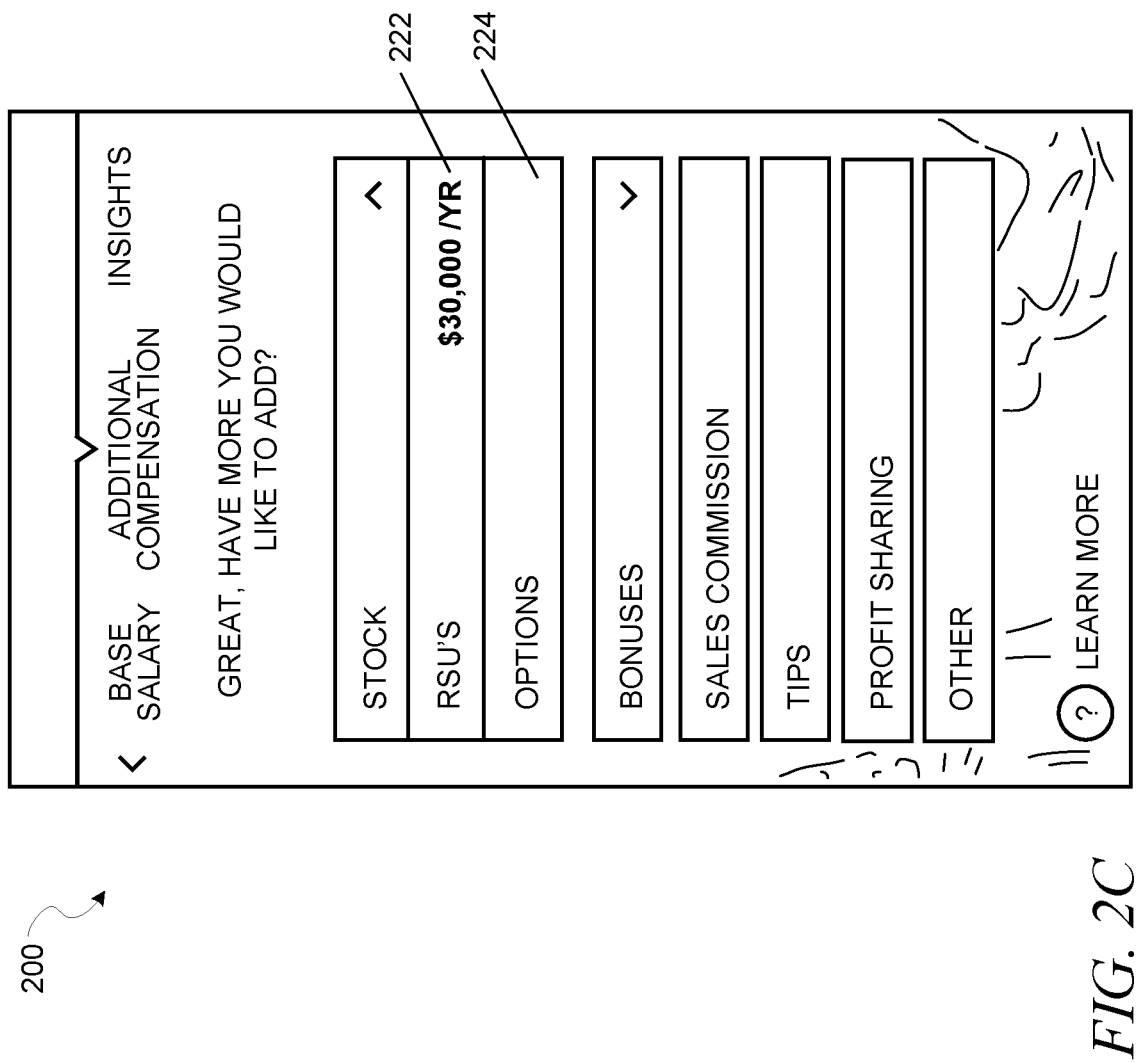

Turning now to more detail about the submission process, FIGS. 2A-2C are screen captures illustrating an example of a user interface 200 provided by the confidential data frontend 104, in accordance with an example embodiment. Referring first to FIG. 2A, the user interface 200 here is depicted as a screen of a standalone application operating on a mobile device, such as a smartphone. In FIG. 2A, the user is prompted to enter a base salary in a text box 202, with a drop-down menu providing options for different time periods on which to measure the base salary (e.g., per year, per month, per hour, etc). Additionally, the user may be identified by name at 204, the user's title may be identified at 206, and the user's current employer may be identified at 208. This information may be pre-populated into the user interface 200, such as by retrieving this information from a member profile for the user in a social networking service. This eliminates the need for the user to enter this information manually, which can have the effect of dissuading some users from providing the confidential information or completing the submission process, especially on a mobile device where typing or otherwise entering information may be cumbersome.

Turning to FIG. 2B, here the user interface 200 displays a number of other possible compensation types 210-220 from which the user can select. Selecting one of these other possible compensation types 210-220 causes the user interface 200 to provide an additional screen where the user can submit confidential data regarding the selected compensation type 210-220. Here, for example, the user has selected "Stock" 212. Referring now to FIG. 2C, the user interface 200 then switches to this screen, which allows the user to provide various specific details about stock compensation, such as restricted stock unit (RSU) compensation 222 and options 224. The user interface 200 at this stage may also display the other compensation types 210-220 that the user can make additional submissions for.

Referring back to FIG. 2B, when the user has completed entering all the confidential data, such as all the different compensation types appropriate for his or her current job, a "Get insights" button 226 may be selected, which launches a process by which the confidential data backend 106 determines whether the user is eligible to receive insights from confidential data from other users and, if so, indicates to the confidential data backend 106 that the insights should be provided. Additionally, selection of the "Get insights" button 226 represents an indication that the submission of the confidential data by this user has been completed, causing the confidential data backend 106 to store the confidential data in the confidential information database 108 as described below, which then may trigger the databus listener 110 to extract the confidential information and cause the ETL backend 114 to anonymize the confidential data and place it in the appropriate ETL tables corresponding to the appropriate slices in which the confidential data belongs. This permits the submitted confidential data to be available for future insights.

Figure 3:
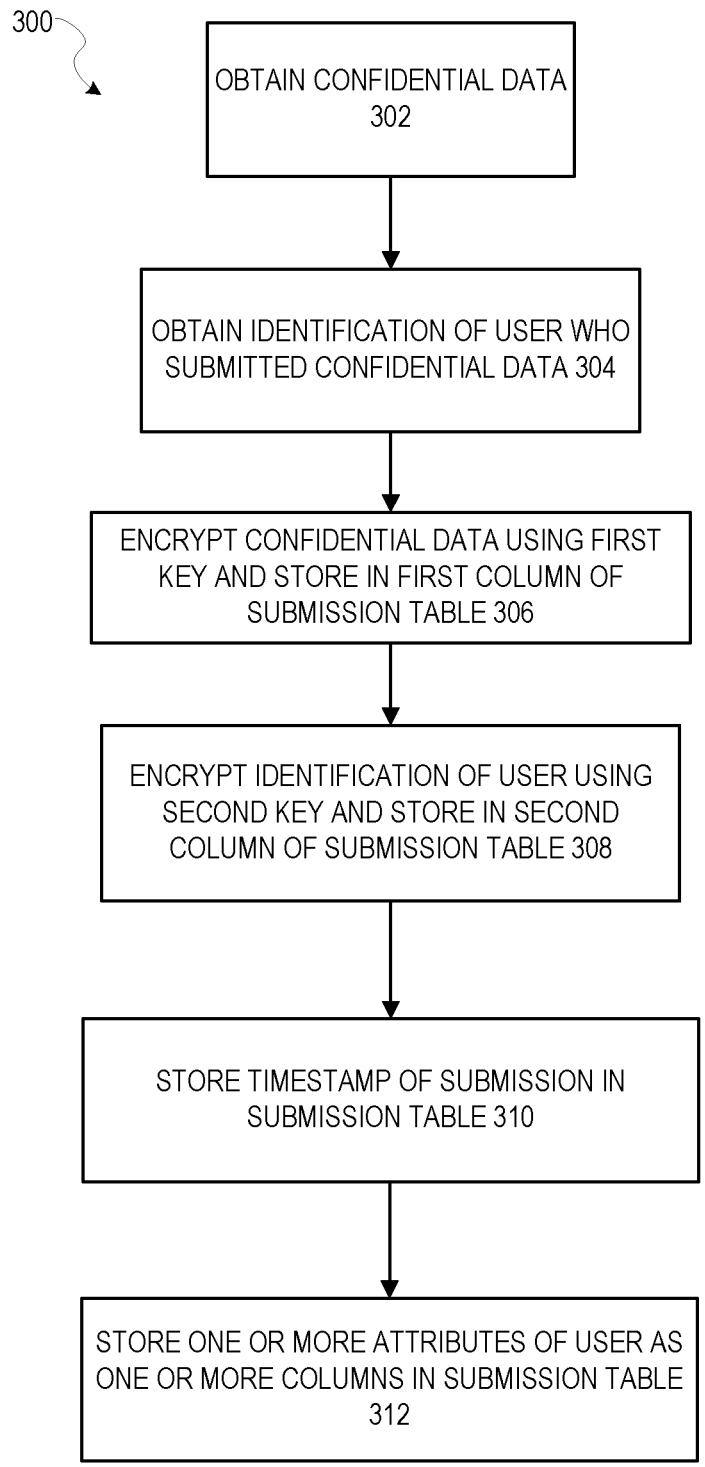
FIG. 3 is a flow diagram illustrating a method for confidential data collection and storage, in accordance with an example embodiment.

FIG. 3 is a flow diagram illustrating a method 300 for confidential data collection and storage, in accordance with an example embodiment. In an example embodiment, the method 300 may be performed by the confidential data backend 106 of FIG. 1. At operation 302, confidential data is obtained. At operation 304, an identification of the user who submitted the confidential data is obtained. It should be noted that while operations 302 and 304 are listed separately, in some example embodiments they may be performed in the same operation. For example, in an example embodiment, the confidential data frontend 104 may, upon receiving an indication from a user that input of confidential data in the confidential data frontend 104 by the user has been completed, forward the inputted confidential data and an identification of the user to the confidential data backend 106. In other example embodiments, however, the operations 302 and 304 may be performed separately. For example, in an example embodiment, the identification of the user may not be obtained directly from the confidential data frontend 104, but rather some other type of identifying information may be obtained directly from the confidential data frontend 104, and this other type of identifying information may be used to query a social networking service or other third-party service for the identification information for the user. Regardless, after operations 302 and 304 have been performed, the confidential data backend 106 has at its disposal some confidential data and identification information for the user who entered the confidential data.

It should be noted that the confidential data may be a single piece of information, or may be multiple related pieces of information. For example, the confidential data may simply include a total compensation value and nothing more, or may include a complete breakdown of different types of compensation (e.g., base salary, bonus, stock, etc.

Users are understandably concerned about the security of the confidential information, and specifically about a malicious user being able to correlate the confidential information and the identification of the user (i.e., not just learning the confidential information but tying the confidential information specifically to the user). As such, at operation 306, the confidential data is encrypted using a first key and stored in a first column of a submission table in a confidential information database. Then, at operation 308, the identification of the user who submitted the confidential data is separately encrypted using a second key and stored in a second column of the submission table in the confidential information database.

Additionally, a number of optional pieces of information may, in some example embodiments, be stored in the submission table at this point. At operation 310, a timestamp of the submission of the confidential data may be stored in a column in the submission table. This timestamp may be used in, for example, a determination of whether the user is eligible to receive insights from confidential data submitted by other users. At operation 312, one or more attributes of the user may be stored as one or more columns in the submission table. These attributes may be used, for example, in determining to which slice(s) the confidential data may apply, as will be described in more detail below.

Figure 4:
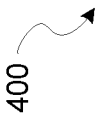
FIG. 4 is a diagram illustrating an example of a submission table, in accordance with an example embodiment.

FIG. 4 is a diagram illustrating an example of a submission table 400, in accordance with an example embodiment. Each row in the submission table 400 corresponds to a different submission. Here, the submission table 400 includes five columns. In a first column 402, confidential data encrypted by a first key is stored. In a second column 404, identification of the user who submitted the corresponding confidential data, encrypted by a second key, is stored. In a third column 406, a timestamp for the submission is stored. In a fourth column 408, a first attribute of the user, here location, is stored. In a fifth column 410, a second attribute of the user, here title, is stored. Of course, there may be additional columns to store additional attributes or other pieces of information related to the submission.

Notably, FIG. 4 depicts an example embodiment where only the first and second columns 402, 404 are encrypted, using different encryption keys. In some example embodiments, the additional columns 406-410 may also be encrypted, either individually or together. In some example embodiments, one or more of these additional columns 406-410 may be encrypted using the same key as the first or second column 402, 404. Furthermore, in some example embodiments, the submission table 400 may be additionally encrypted as a whole, using a third encryption key different from the keys used to encrypt the first and second columns 402, 404.

It should be noted that while FIGS. 3 and 4 describe the confidential data as being stored in a single column in a submission table, in some example embodiments, this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the submission table. Nevertheless, the processes described herein with regard to the "column" in which the confidential data is stored apply equally to the embodiments where multiple columns are used (e.g., the individual pieces of compensation information are still encrypted separately from the user identification information).

Figure 5:
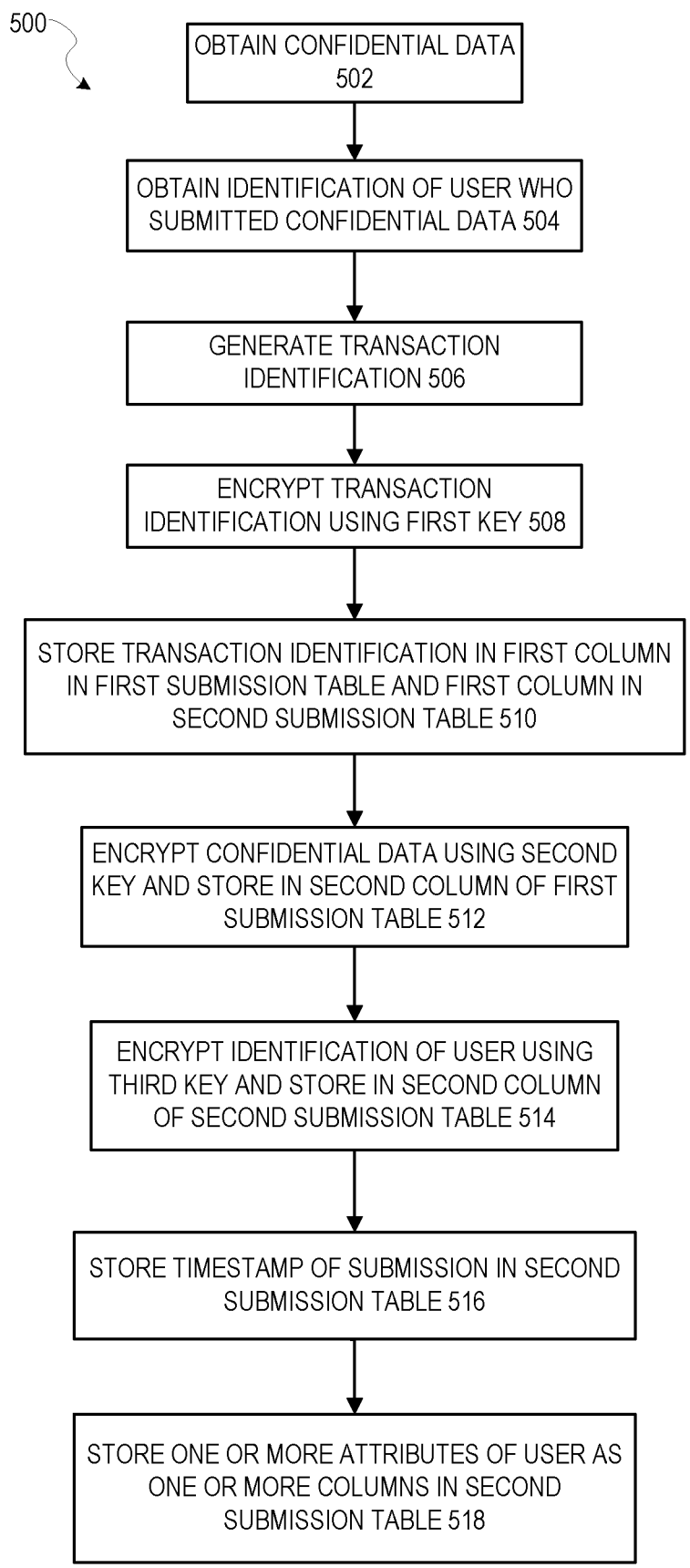
FIG. 5 is a flow diagram illustrating a method for confidential data collection and storage, in accordance with an example embodiment.

FIG. 5 is a flow diagram illustrating a method 500 for confidential data collection and storage, in accordance with an example embodiment. In contrast with FIG. 3, FIG. 5 represents an example embodiment where the confidential data and the identification of the user who submitted the confidential data are stored in separate tables in order to provide additional security. At operation 502, confidential data is obtained. At operation 504, an identification of the user who submitted the confidential data is obtained. As in FIG. 3, while operations 502 and 504 are listed separately, in some example embodiments they may be performed in the same operation.

At operation 506, a transaction identification is generated. This transaction identification may be, for example, a randomly generated number or character sequence that uniquely identifies the submission. At operation 508, the transaction identification may be encrypted using a first key. At operation 510, the transaction information (either encrypted or not, depending upon whether operation 508 was utilized) is stored in a first column in a first submission table and in a first column in a second submission table in a confidential information database.

At operation 512, the confidential data is encrypted using a second key and stored in a second column of the first submission table in the confidential information database. Then, at operation 514, the identification of the user who submitted the confidential data is separately encrypted using a third key and stored in a second column of the second submission table in the confidential information database.

Additionally, as in FIG. 3, a number of optional pieces of information may, in some example embodiments, be stored in the first and/or second submission tables at this point. At operation 516, a timestamp of the submission of the confidential data may be stored in a column in the second submission table. This timestamp may be used in, for example, a determination of whether the user is eligible to receive insights from confidential data submitted by other users. At operation 518, one or more attributes of the user may be stored as one or more columns in the second submission table. These attributes may be used, for example, in determining to which slice(s) the confidential data may apply, as will be described in more detail below. It should be noted that while operations 516 and 518 are described as placing information in the second submission table, in other example embodiments, one or more of these pieces of information may be stored in the first submission table.

If operation 508 is utilized, then the fact that the transaction identification is encrypted and is the only mechanism by which to link the confidential data in the first submission table with the user identification in the second submission table through a join operation provides an additional layer of security.

Figure 6:
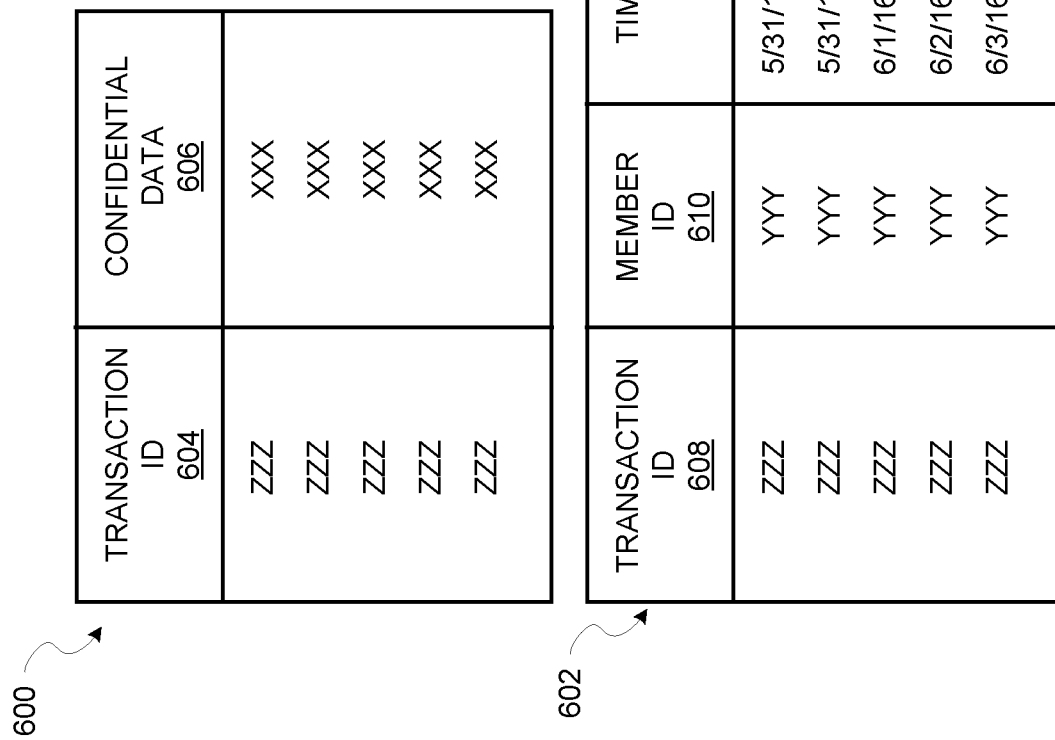
FIG. 6 is a diagram illustrating an example of a first submission table and a second submission table, in accordance with an example embodiment.

FIG. 6 is a diagram illustrating an example of a first submission table 600 and a second submission table 602, in accordance with an example embodiment. Each row in each of the first and second submission tables 600, 602 corresponds to a different submission. Here, the first submission table 600 includes two columns. In a first column 604, transaction identification information encrypted by a first key is stored. In a second column 606, confidential data encrypted by a second key is stored.

The second submission table 602 includes five columns. In a first column 608, transaction identification information encrypted by the first key is stored. In a second column 610, identification of the user who submitted the corresponding confidential data, encrypted by a third key, is stored. In a third column 612, a timestamp for the submission is stored. In a fourth column 614, a first attribute of the user (here location) is stored. In a fifth column 616, a second attribute of the user, here title, is stored. Of course, there may be additional columns to store additional attributes or other pieces of information related to the submission.

Notably, FIG. 6 depicts an example embodiment where only the first and second columns 608, 610 of the second submission table 602 are encrypted, using different encryption keys. In some example embodiments, the additional columns 612-616 may also be encrypted, either individually or together. Furthermore, in some example embodiments, the first and/or second submission tables 600, 602 may be additionally encrypted as a whole, using an additional encryption key(s) different from the keys described previously.

It should be noted that while FIGS. 5 and 6 describe the confidential data as being stored in a single column in a first submission table, in some example embodiments this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the first submission table. Nevertheless, the processes described herein with regard to the "column" in which the confidential data is stored apply equally to the embodiments where multiple columns are used (e.g., the individual pieces of compensation information are still encrypted separately from the user identification information).

As described above, there is a trade-off between quality of statistical insights calculated based on submitted confidential data and coverage. In the example of compensation information, percentile estimates of compensation can be calculated for cohorts of various degrees of granularity, but those percentiles estimated for cohorts with small sample sizes can wind up being unstable in that they can fluctuate significantly with the addition or exclusion of a few entries.

In an example embodiment, a log-linear model is created to estimate confidential data for a given cohort. This model may be used to estimate the prior mean and variance, and then determine the posterior distribution by taking into account the observed entries. It should be noted that this technique can be utilized even in cases where profile-level data is unavailable. In other words, it may be used where the available data is anonymized and only a few attributes, such as title and location are associated with the observed set of confidential data entries. As such, this technique works well with the aforementioned anonymized submitted confidential data entries. Additionally, the distribution may be inferred as well. This allows for both quality of confidential data insights and coverage.

It should be noted that in some embodiments, a different model may be used for different countries, such that each cohort, even if location is not specified, is country-specific.

In an example embodiment, a regression model is used to predict confidential data for a given cohort, even if there are not enough actually gathered data points for that cohort. The prior mean and variance are estimated and used to determine the posterior distribution, which can then be used in lieu of actual statistical confidential data data points.

In an example embodiment, an algorithm is designed to output a model that can be used to predict confidential data values based on a feature vector derived from the cohort type. The model can also be used to produce an inferred distribution for each cohort, from which percentiles can be obtained.

Figure 7:
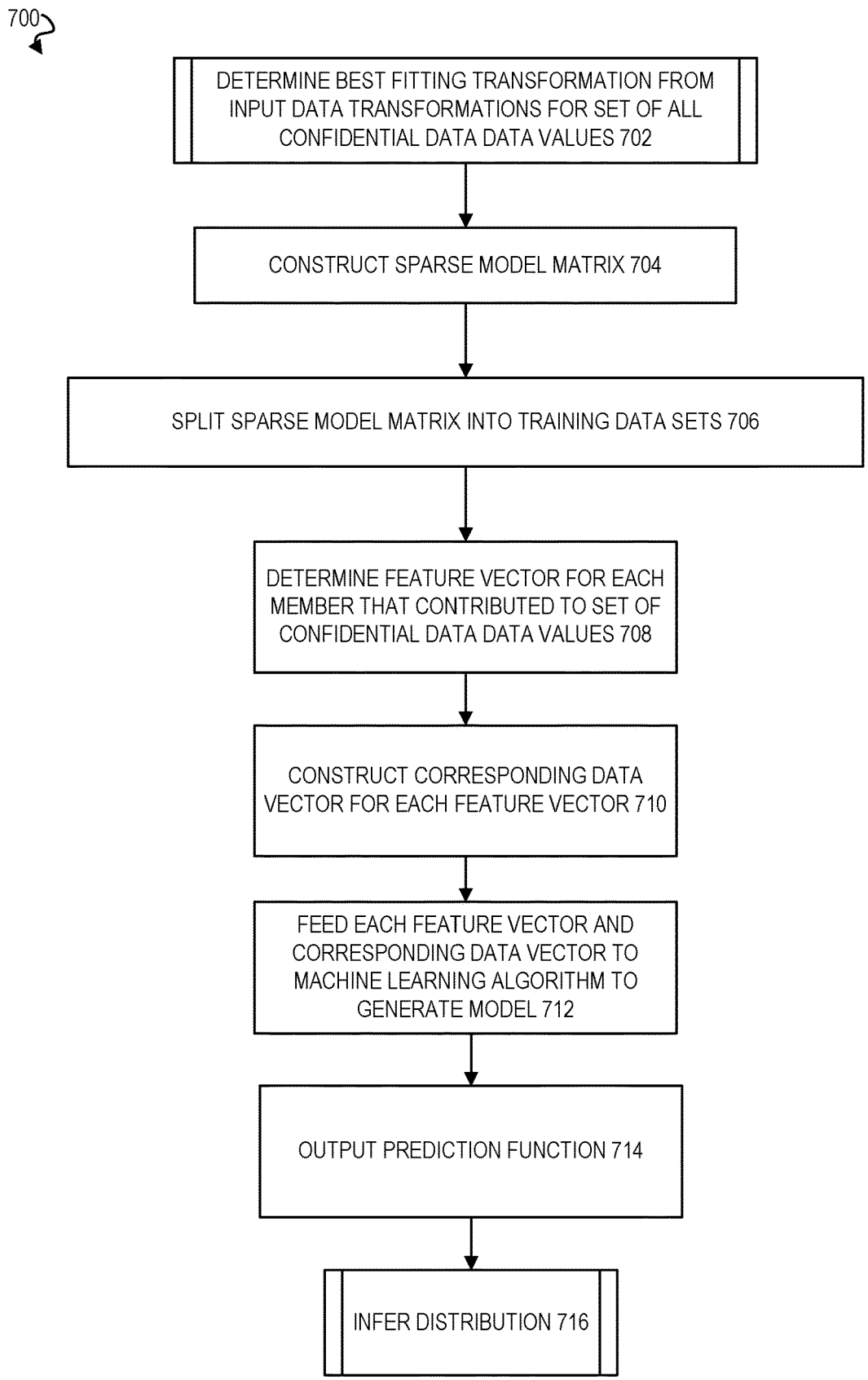
FIG. 7 is a flow diagram illustrating a method of using a log-linear model to predict confidential data values in a computer system, in accordance with an example embodiment.

FIG. 7 is a flow diagram illustrating a method 700 of using a log-linear model to predict confidential data values in a computer system, in accordance with an example embodiment. This method 700 may be executed for each country and for each type of confidential data. For example, the method 700 may be executed once for base salary in the U.S. and again for annual bonus in the U.S. Likewise, the method 700 may be executed once for base salary in the U.S. and again for base salary in England.

Input to this method 700 may include a cohort type (e.g., title, country, region), an anonymized set of confidential data data values for different cohorts belonging to the cohort type, and a set of candidate data transformations, as will be described later.

Figure 8:
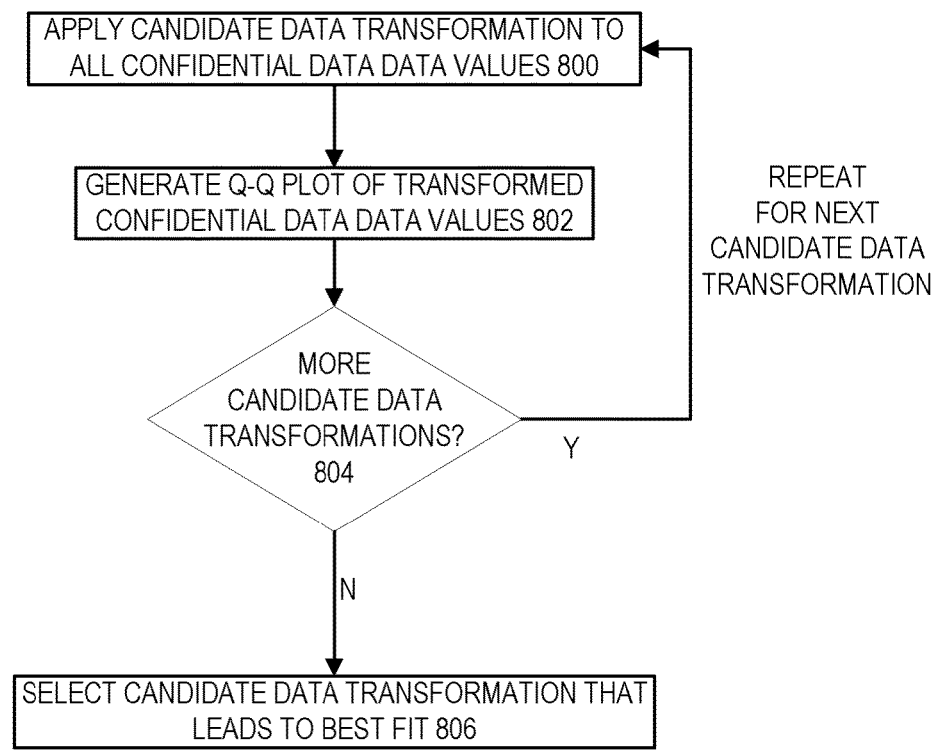
FIG. 8 is a flow diagram illustrating a method for determining the best fitting data transformation in accordance with an example embodiment.
Figure 9:
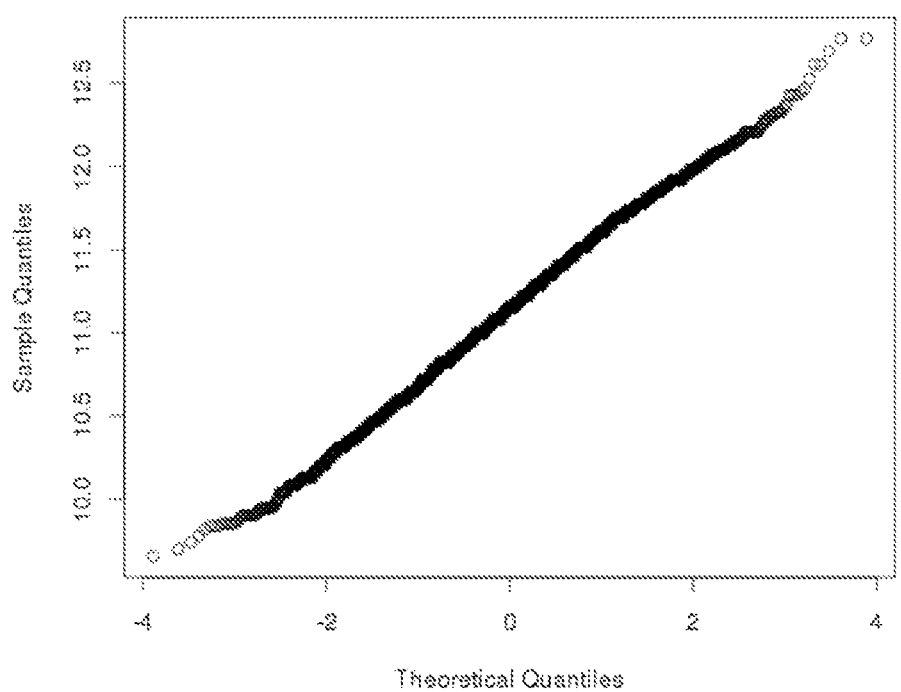
FIG. 9 is a diagram illustrating an example of a generated q-q plot in accordance with an example embodiment.

At operation 702, the best fitting data transformation g*( ) from the input data transformations for the set of all confidential data data values can be determined. Specifically, the candidate data transformations may include transformations such as the identity, log, and/or square root transformations. These transformations may be, for example, monotonic. Thus, operation 702 may include trying each candidate data transformation to determine which one is the best fit. FIG. 8 is a flow diagram illustrating a method of operation 702 for determining the best fitting data transformation in accordance with an example embodiment. A loop is begun for each of the candidate data transformations. At operation 800, the candidate data transformation g is applied to all confidential data data values. At operation 802, a quantile-quantile (q-q) plot of the transformed confidential data data values is generated. A q-q plot is a plot of quantiles of a first data set against quantiles of a second data set. A quantile is a fraction or percentage of points below a given value. FIG. 9 is a diagram illustrating an example of a generated q-q plot in accordance with an example embodiment.

At operation 804, it is determined if there are any more candidate data transformations. If so, then the method of operation 702 returns to operation 800 for the net candidate data transformation. If not, then at operation 806 the candidate transformation that leads to the best fit is selected. In an example embodiment, this is the transformation that produced a q-q plot that is closest to a straight line across the diagonal.

Referring back to FIG. 7, at operation 704, a sparse model matrix U is constructed with anonymized members as rows and relevant features as columns. At operation 706, the sparse model matrix U is split into training data sets to be used to perform machine learning model training/cross validation and prediction.

At operation 708, for each member that contributed to the input anonymized set of confidential data data values, a feature vector x containing features determined by the cohort type is constructed. For example, in the case of a title-country-region cohort type, binary versions of position-related features such as title, title group, and function may be constructed, binary versions of location-related features such as country, state, region, and city may be constructed, and binary versions of interaction features such as title-region and function-region may be constructed.

At operation 710, a corresponding confidential data vector v for each feature vector f is constructed after applying the best fitting transformation selected in operation 702.

At operation 712, each feature vector f and corresponding confidential data vector v are fed to a machine-learning algorithm to generate a model f( ) for mapping the feature vector to the transformed compensation. In one example embodiment, this machine-learning algorithm is a regression machine-learning algorithm.

In an example embodiment, regularization may be performed such as L2, L1 or a convex combination of the two. Regularization introduces additional information in order to solve a problem or prevent overfitting in a statistical function. The additional information is typically in the form of a regularization term. L1 involves the term being a sum of weights, while L2 involves the term being a sum of square of weights.

At operation 714, the prediction function f( ) is output. The prediction in the original space can be obtained by obtaining the reverse transformation to the output of the model, that is $g^{*-1}(f)$).

Figure 10:
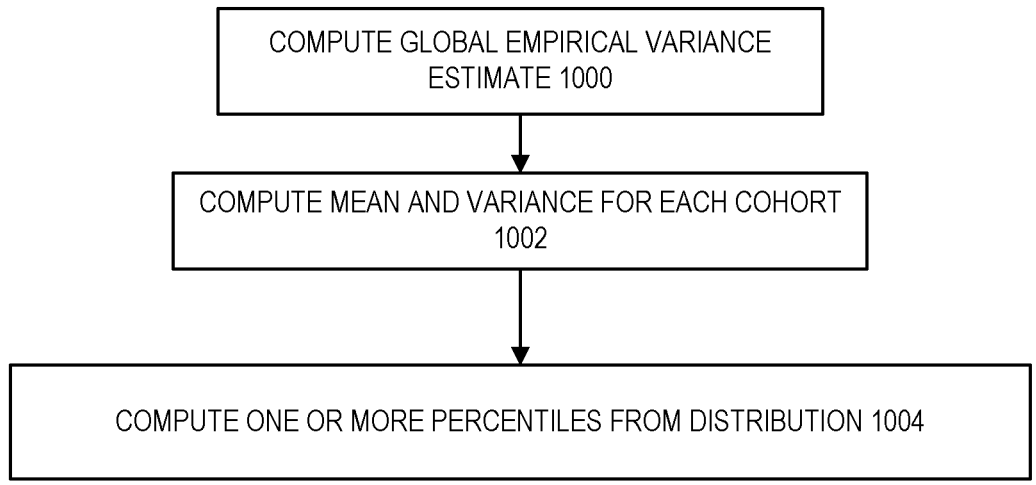
FIG. 10 is a flow diagram illustrating a method of inferring a distribution in accordance with an example embodiment.

At operation 716, a distribution is inferred. FIG. 10 is a flow diagram illustrating a method of operation 716 of inferring a distribution in accordance with an example embodiment. At operation 1000, a global empirical variance estimate is computed.

Assume the design matrix for the above regression model is X and the observations for the regression are U= $\{U_1 \ldots, U_k\}$, k=1, ..., K. The regression model can be then denoted as:

$$U_k \sim N(x_k^* \beta, \sigma^2).$$

For an L2 penalty $\lambda \|\beta\|^2$ in the loss function, we can first learn the estimate of $\beta$ as $\hat{\beta}$ using packages such as Glmnet, given $\lambda$. We can also obtain the empirical estimate of $\sigma^2$ by $$\hat{\sigma}^2 = \frac{\sum_k (U_k - x_k^* \hat{\beta})^2}{K}.$$

At operation 1002, for each cohort, assuming x' is the feature vector after data transformation, the mean may be computed as f(x') and the variance as $\hat{\sigma}^2$. Equivalently, in the original space, the data distribution $$g^{*-1}(N(f(x'), \hat{\sigma}^2)$$

can be output.

At operation 1004, one or more percentiles can be computed from the distribution. For example, the 10th percentile may be computed as p_10=$g^{*-1}$(f(x')−1.282*$\hat{\sigma}$), the 50th percentile as p_50=$g^{*-1}$(f(x')) and the 90th percentile as p_90=$g^{*-1}$(f(x')+1.282*$\hat{\sigma}$).

One benefit of this approach is that this can be used to estimate data even when there is no data for a cohort. Additionally, this approach can be used to flag cohorts where the observed data varies significantly from the estimate, which may be used to flag potential outliers or poor data.

Figure 11:
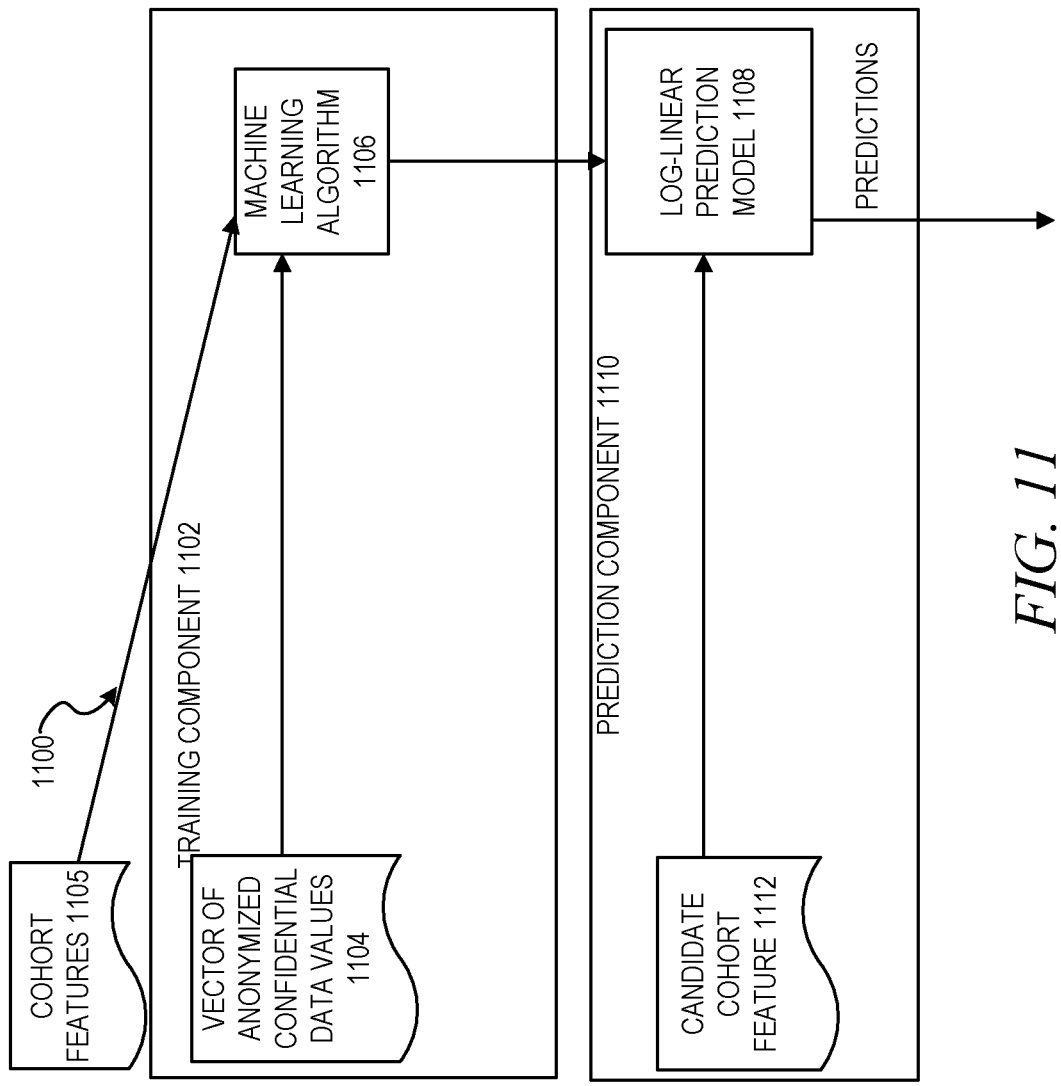
FIG. 11 is a block diagram illustrating a cohort log-linear model machine learning algorithm component, in accordance with an example embodiment.

FIG. 11 is a block diagram illustrating a cohort log-linear model machine-learning algorithm component 1100, in accordance with an example embodiment. In some example embodiments, the cohort log-linear model machine-learning algorithm component 1100 may be located on the confidential data backend 106. As described earlier, each cohort may have its own model.

In a training component 1102, a vector of anonymized confidential data values 1104 and corresponding cohort features 1105 are fed to a machine-learning algorithm 1106. The machine-learning algorithm 1106 then trains a cohort log-linear prediction model 1108. The machine-learning algorithm 1106 may be selected from among many different potential supervised or unsupervised machine-learning algorithms. Examples of supervised machine-learning algorithms include artificial neural networks, Bayesian networks, instance-based learning, support vector machines, random forests, linear classifiers, quadratic classifiers, k-nearest neighbor, decision trees, and hidden Markov models. Examples of unsupervised machine-learning algorithms include expectation-maximization algorithms, vector quantization, and information bottleneck methods. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors).

Specifically, the cohort log-linear prediction model 1108 may be trained to output predictions for cohort values and distributions, such as mean and variance.

In a prediction component 1110, a candidate cohort feature vector 1112 is fed to the trained cohort log-linear prediction model 1108, which outputs prediction(s) for data value(s) and/or distributions for the corresponding candidate cohort.

In another example embodiment, a method for computing a smoother posterior distribution of a given confidential data type for cohorts with small sample sizes is provided. This further enhances the previously stated goals, thus maximizing both quality of confidential data and coverage. Furthermore, this also acts to minimize the risks for privacy, as observing highly sensitive empirical percentiles based on a small number (e.g., less than ten) data points over time can lead to the guessing of identity of members submitting the confidential data.

As such, in an example embodiment, for cohorts with large sample size, the aforementioned practice of reporting empirical percentiles can be utilized. For cohorts with small sample sizes, however, statistical smoothing may be performed by combining cohort estimates with actual observed entries. As such, a threshold may be set that differentiates between small sample sizes and large sample sizes for cohorts. In one example embodiment, this threshold may be set at around 30 data points. In some example embodiments, this threshold may vary based on a variety of factors, such as country, cohort granularity, or cohort features.

The intuition for the statistical smoothing is that estimates for a cohort (for example, title and region cohort) can be obtained by making use of data for the underlying individualized cohorts (for example, title cohort and region cohort). Furthermore, there may be a greater weighting assigned to data based on observed entries as the number of observed entries increases.

More particularly, in an example embodiment, a model may be built to estimate log(confidential data type) for a given cohort and to use this model to estimate the prior mean and variance. Then, smoothed estimates of percentiles can be obtained using this prior mean and variance. This approach could potentially be extended for reporting estimated percentiles even for cohorts with no data. The estimation model may use the log-linear approach described earlier, or may alternatively utilize a hierarchical model to determine the best parent for a given cohort to determine the prior mean and variance.

In an example embodiment, the cohort of interest is denoted as y, and the observed log-transformed salary data that belong toy as $y_i$, i=n, with the empirical average to be $\bar{y}$. When n is less than some threshold (e.g., 10-20), empirical percentiles may not work anymore due to the sparsity of the data.

One solution would be to "borrow strength" from y's parent cohorts that have enough data to estimate a distribution (e.g., 30-100 points). The list of candidate parent cohorts can be picked as the set of all cohorts that contain y as a subset, and with sample size meeting the threshold (30-100). This set is denoted as P.

Since it is very likely that the size of P ends up greater than 1, and mathematically, it is much easier to start with only one parent to work with, the first step is to be able to pick the "best" parent cohort out of P.

Assume y has K closest parents in P, denoted as $z_1, \ldots, z_K$. Also assume for cohort $z_j$, the salary data follow a log-normal distribution, with mean $u_j$ and variance $\sigma_j^2$ after the log transformation. The best $z_j$ out of the K parents can be picked by the following criteria (maximizing log-likelihood), and using the empirical estimates of $u_j$ and $\sigma_j^2$ since there are enough samples:

$$\underset{j}{\operatorname{argmin}} \frac{n}{2}\log(2\pi\sigma_j^2) + \frac{\sum_i (y_i - \mu_j)^2}{2\sigma_j^2} =$$

$$\underset{j}{\operatorname{argmin}} \frac{n}{2}\log(2\pi\sigma_j^2) + \frac{\sum_i (y_i - \bar{y})^2 + n(\bar{y} - \mu_j)^2}{2\sigma_j^2}$$

The corresponding $u_j$ and $\sigma_j^2$ that provides the max of the log-likelihood may be used as the prior for the smoothing of the salary percentiles in cohort)). Assume the best parent cohort z: contains m samples, $\operatorname{Var}[\mu_j] = \sigma_j^2/m$.

Also note that it is not necessary to store each individual sample pointy; for the computation, since the sample variance of data in cohort y is equal to $\Sigma_i(y_i-\bar{y})^2/n$. Hence, as long as the sample size n, mean $\bar{y}$ and variance $\Sigma_i(y_i-\bar{y})^2/n$ are stored, the above formula can be computed in a very cheap way.

For cohort y, suppose now we assume the cohort z as a parent to provide the following parameters: mean $\mu$ and variance $\sigma^2$ for z, and also the number of samples in cohort z denoted as m. The following model can be assumed for the data)), after the log transformation, i=1, ..., n in y:

$$y_i \sim N(\nu, \tau^2), i=1, \ldots, n$$

where $\nu$ and $\tau^2$ have the following prior distribution:

$$\nu \mid \tau^2 \sim N\left(\mu, \frac{\tau^2}{n_0}\right), \tilde{\tau} = 1/\tau^2 \sim \operatorname{Gamma}(\eta/\sigma^2, \eta),$$

where $n_0 = m/\delta$, and $\delta$ is a tuning parameter (e.g., 5). $\eta$ is also a tuning parameter, for example, 10. For the Gamma distribution, $1/\sigma^2$ is the prior mean and $\eta$ is the prior sample size.

Let $$\bar{y} = \sum_i y_i/n,$$

i.e., the elliptical average of observations in y. First, the joint posterior $$p(v,\tilde{\tau}|y_1, \ldots, y_n) \propto p(y_1, \ldots, y_n|v,\tilde{\tau}) p(v|\tilde{\tau}) p(\tilde{\tau}),$$

The marginal posterior of $$p(\tilde{\tau}|y_1, \ldots, y_n) = \int p(y_1, \ldots, y_n | v, \tilde{\tau}) p(v | \tilde{\tau})$$

$$p(\tilde{\tau}) dv \sim \text{Gamma}\left(\frac{n}{2} + \frac{\eta}{\sigma^2}, \eta + \frac{1}{2}\sum_i (y_i - \bar{y})^2 + \frac{nn_0}{2(n+n_0)}(\bar{y}-\mu)^2\right).$$

Hence the posterior mean of $$\hat{\tilde{\tau}} = \frac{\frac{n}{2} + \frac{\eta}{\sigma^2}}{\eta + \frac{1}{2}\sum_i (y_i - \bar{y})^2 + \frac{nn_0}{2(n+n_0)}(\bar{y}-\mu)^2}.$$

For simplicity, $\hat{\tilde{\tau}}$ is used as the estimate of $\tilde{\tau}$ for the rest of the calculation. Given $\tilde{\tau}=\hat{\tilde{\tau}}$, the posterior of v is $$p(v | \tilde{\tau}, y_1, \ldots, y_n) \propto$$

$$p(y_1, \ldots, y_n | v, \tilde{\tau}) p(v | \tilde{\tau}) \sim N\left(\frac{n}{n+n_0}\bar{y} + \frac{n_0}{n+n_0}\mu, \frac{1}{(n+n_0)\tilde{\tau}}\right).$$

For any new observation $y_{new}$, $$E[y_{new} | y_1, \ldots, y_n] = E[v | \tilde{\tau}, y_1, \ldots, y_n] = \frac{n}{n+n_0}\bar{y} + \frac{n_0}{n+n_0}\mu,$$

$$\text{Var}[y_{new} | y_1, \ldots, y_n] =$$

$$E[\text{Var}[y_{new} | y_1, \ldots, y_n, v]] + \text{Var}[E[y_{new} | y_1, \ldots, y_n, v]] =$$

$$\hat{\tau}^2 + \text{Var}[v | y_1, \ldots, y_n] = \hat{\tau}^2 + \frac{\hat{\tau}^2}{n+n_0} = \left(1 + \frac{1}{n+n_0}\right)\hat{\tau}^2$$

In an example embodiment, the execution flow is as follows. The input to the flow may be the data for cohort y as $y_1, \ldots, y_n$. For the best cohort parent z of y, let z's sample size be m, mean be $\mu$ and variance be $\sigma^2$. Also, the empirical average of $y_1, \ldots, y_n$ can be obtained as $\bar{y}$. Tuning parameters s and $\delta$ and $\eta$ may be used. $\delta$ is how much to penalize the sample size from z, as a discounting of the inheritance, and $\eta$ is how many samples the prior has for the variance computation (e.g., 10). If $n_0=m/\delta$, then the posterior mean of $\tau^2$ may be estimated as:

$$\hat{\tau}^2 = \frac{\eta + \frac{1}{2}\sum_i (y_i - \bar{y})^2 + \frac{nn_0}{2(n+n_0)}(\bar{y}-\mu)^2}{\frac{n}{2} + \frac{\eta}{\sigma^2}}.$$

Consider a new observation, $y_{new}$ being added to the population of existing observations of y. Then the mean and variance of $y_{new}$ (after the log-transformation) are $$E[y_{new} | y_1, \ldots, y_n] = \frac{n}{n+n_0}\bar{y} + \frac{n_0}{n+n_0}\mu,$$

$$\text{Var}[y_{new} | y_1, \ldots, y_n] = \left(1 + \frac{1}{n+n_0}\right)\hat{\tau}^2.$$

The 10th percentile of log(salary) for cohort y is $$E[y_{new}|y_1, \ldots, y_n] - 1.282*\text{sqrt}(\text{Var}[y_{new}|y_1, \ldots, y_n])$$

The 90th percentile of log(salary) for cohort y is $$E[y_{new}|y_1, \ldots, y_n] + 1.282*\text{sqrt}(\text{Var}[y_{new}|y_1, \ldots, y_n])$$

The final estimates are computed by taking the exponential transformation to the above two.

It should be noted that in some example embodiments, some cohorts may contain only title and region, and of these only a small percentage (e.g., only 30%) may have enough coverage for computing the empirical percentiles. However, using parent cohorts such as title only or region individually might not be good enough, as both attributes are sometimes needed. Therefore, in an example embodiment a regression model, title+region+titleXregion, is used to perform smoothing for these cohorts, with the data that includes these two attributes only, rather than using the proposed parent cohort approach.

Assume the design matrix for the above regression model is X, and the observations for the regression are U={$u_1, \ldots, u_k$}, k=1, . . . , K. The regression model can be then denoted as $$U_k \sim N(x_k'\beta, \sigma^2)$$

For an L2 penalty $\lambda\|\beta\|^2$ in the loss function, the estimate of $\beta$ as $\hat{\beta}$ may be learned given $\lambda$. The empirical estimate of $\sigma^2$ can be obtained by $$\hat{\sigma}^2 = \frac{\sum_k (U_k - x_k'\hat{\beta})^2}{K},$$

and $$\text{Var}[\hat{\beta}] = \left(\frac{X'X}{\hat{\sigma}^2} + \lambda I\right)^{-1}$$

The above regression model can be used for two scenarios:

Scenario 1: For a cohort y that only has two attributes, title and region, but does not have enough samples to obtain the estimate of percentiles, assume the feature vector for cohort y is x, we can let $\mu=x'\hat{\beta}$, $\sigma^2\hat{\sigma}^2$, and apply model to obtain posterior of v and $\tau^2$.

Scenario 2: After the posterior of v and $\tau^2$ for all the cohorts with (title, region) that are under the threshold have been obtained, they can also be used to perform smoothing for children of these cohorts too, if necessary.

Figure 12:
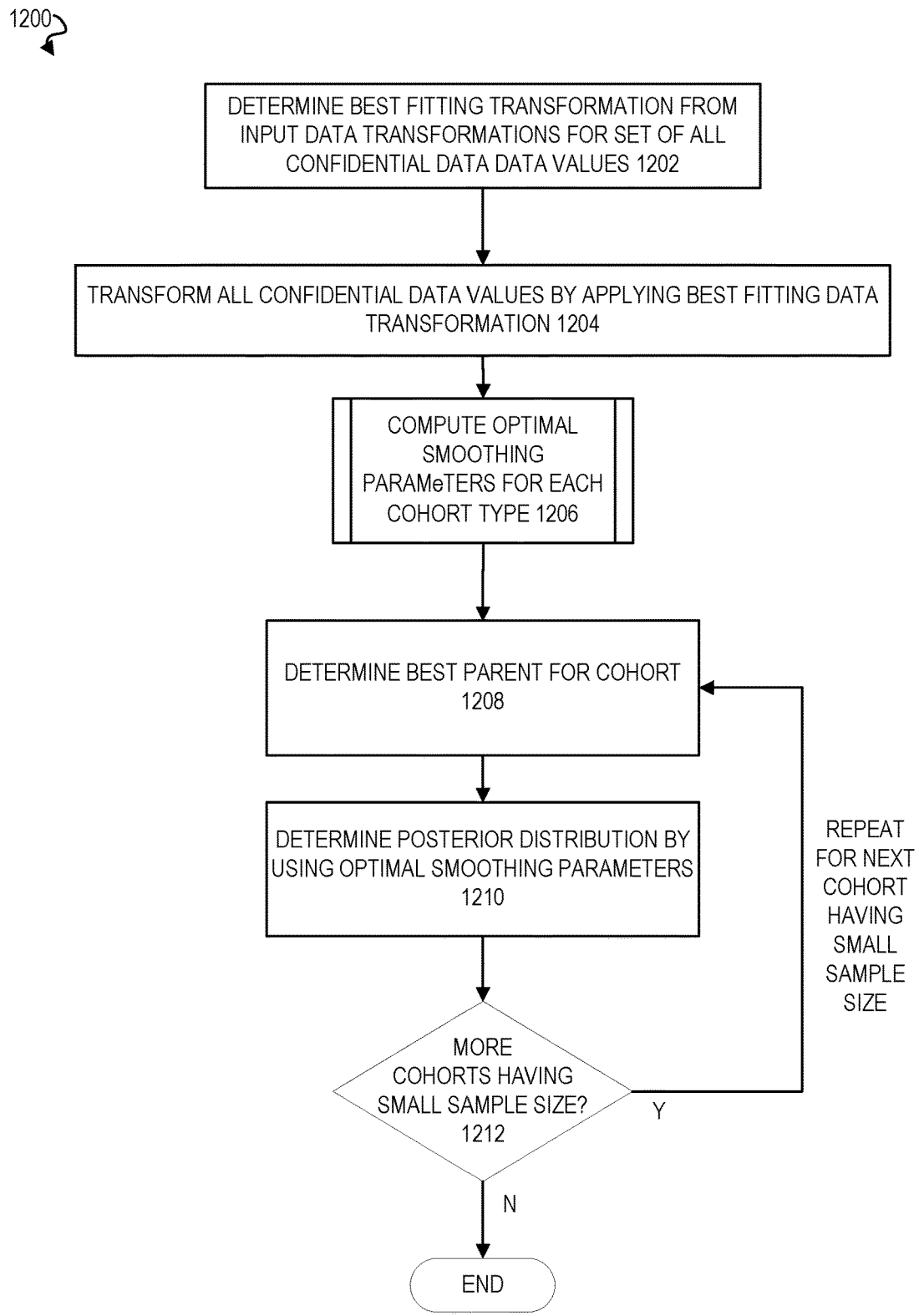
FIG. 12 is a flow diagram illustrating a method of computing a smoother posterior distribution of a given confidential data type in a computer system, in accordance with an example embodiment.

FIG. 12 is a flow diagram illustrating a method 1200 of computing a smoothed posterior distribution of a given confidential data type in a computer system, in accordance with an example embodiment.

Input to this method 1200 may include a set of cohort types (e.g., title-, country-, region, title-country, region-country, title-industry-country-region, etc.), an anonymized set of confidential data values for different cohorts belonging to each cohort type, and a set of candidate data transformations. The method 1200 may be repeated for each country and each confidential data type (e.g., base salary, annual bonus, sign on bonus, commission, tips, stock, total compensation, etc.).

At operation 1202, the best fitting data transformation g*( ) from the input data transformations for the set of all confidential data data values can be determined. Specifically, the candidate data transformations may include transformations such as the identity, log, and/or square root transformations. These transformations may be, for example, monotonic. Thus, operation 1202 may include trying each candidate data transformation to determine which one is the best fit. This may be performed by using, for example, method 702 depicted in FIG. 8 and described in the corresponding text above.

At operation 1204, all confidential data values are transformed by applying the best fitting data transformation g*. Then, at operation 1206, optimal smoothing parameters are computed for each cohort type.

Figure 13:
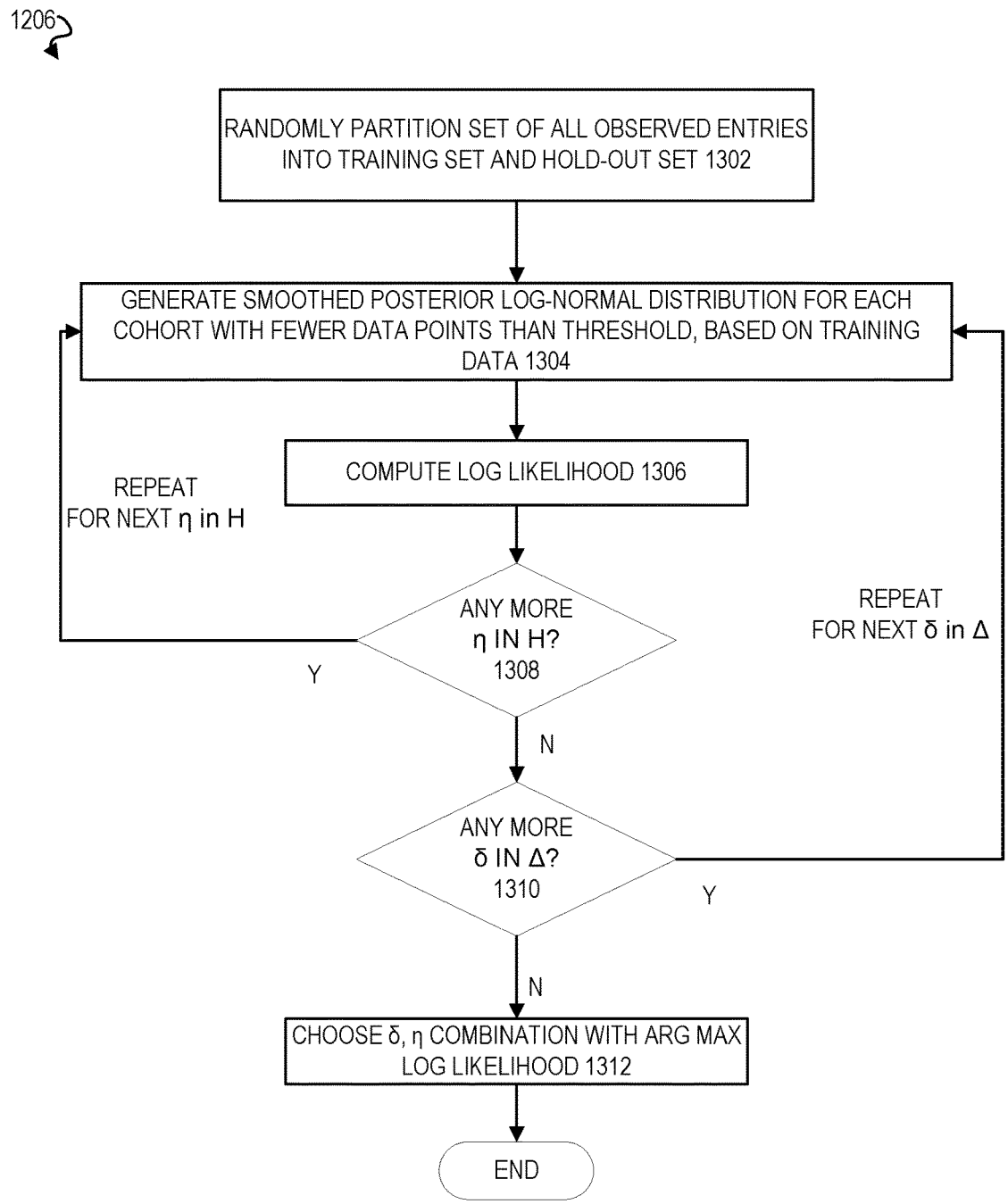
FIG. 13 is a flow diagram illustrating a method for computing optimal smoothing parameters for each cohort type in accordance with an example embodiment.

FIG. 13 is a flow diagram illustrating a method of operation 1206 for computing optimal smoothing parameters for each cohort type in accordance with an example embodiment. 6 may be considered a discounting factor for the effect of the parent cohort while η is a parameter used in the prior gamma distribution for choosing variance. The likelihood of observing a hold-out set, with respect to the posterior distribution computed with each choice of smoothing parameters, is maximized. Specifically, at operation 1302, the set S of all observed entries (restricted to cohorts requiring smoothing, e.g., ones with sample sizes less than the threshold) is randomly partitioned into a training set and a hold-out set. In an example embodiment, the training set may include 90% of the data values while the hold-out set includes the remaining 10%. This may be performed over all possible cohorts. Δ (e.g., 1 to 50) may be the candidate set of choices for δ, while H (e.g., 0.01*20 to 11) is the candidate set of choices for η. For sin S, let c(s) denote the corresponding cohort. For cohort c, let D_posterior(c) denote the smoothed posterior log-normal distribution.

A loop is then begun for each δ in Δ and for each η in H. At operation 1304, a smoothed posterior log-normal distribution for each cohort with fewer data points than the threshold may be generated, based only on the training data. Then at operation 1306 the log likelihood of observing a hold-out set, S_test with respect to the parameters δ, η is computed using the formula:

logLikelihood($S$_test,δ,η)=sum{$s$ in $S$_test}log
($p$_{$D$_posterior($c$($s$))}($s$)).

At operation 1308, it is determined if there are any more η in H. If so, then the method of operation 1206 returns to operation 1304 for the next η in H. If not, then at operation 1310 it is determined if there are any more δ in Δ. If so, then the method of operation 1206 returns to operation 1304 for the next δ in Δ. If not, then at operation 1312, the δ. η combination that maximizes the log Likelihood is chosen.

In an example embodiment, the optimal parameters can vary for different segments, such as company, different cohort sizes, industry, years of experience, degree, and field of study.

Referring back to FIG. 12, at operation 1208 a loop is begun for each cohort having a small sample size. At operation 1208 the best parent for the cohort is determined as described above. At operation 1210, the posterior distribution is determined as described above, by using the optimal smoothing parameters. At operation 1212, it is determined if there are any more cohorts having a small sample size. If so, then the method 1200 loops back to operation 1208 for the next cohort having a small sample size. If not, then the method 1200 ends.

Additionally, when the confidential data is compensation data, at the individual user level, the total compensation should always at least be equal to the base salary or any other compensation type. However, from the technical perspective, this consistency may not be guaranteed if the aggregate-based compensation and aggregate total compensation are computed independently, such as by using independent outlier detection/smoothing mechanisms.

In an example embodiment, one of two different approaches may be utilized to ensure consistency between total compensation and individual compensation values. This disclosure will focus on base salary versus total compensation since base salary is typically the dominant portion of total compensation, but one of ordinary skill in the art will recognize that the same techniques can be applied for other individual compensation types.

Figure 14:
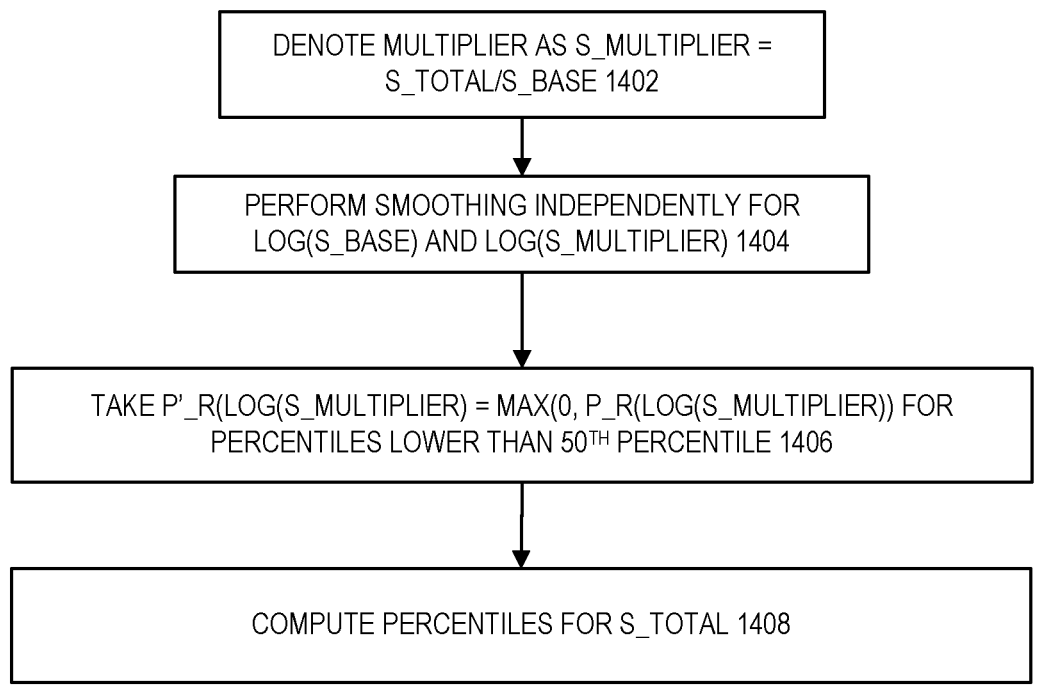
FIG. 14 is a flow diagram illustrating a method for multiplicative smoothing in accordance with an example embodiment.

The first approach is known as the multiplicative smoothing approach. FIG. 14 is a flow diagram illustrating a method 1400 for multiplicative smoothing in accordance with an example embodiment. At operation 1402, a multiplier is denoted as follows:

$s$_multiplier=$s$_total/$s$_base.

When the optimal data transformation is log( ), this has characterization as log (s_total)=log(s_base)+log(s_multiplier). Further, s_multiplier follows a log-normal distribution assuming that s_base and s_total follow log-normal distributions.

At operation 1404, smoothing is performed independently for log (s_base) and log(s_multiplier), thereby obtaining the corresponding posterior smoothed distributions. Since the smoothed mean is obtained via a convex combination, it is guaranteed to be at least 0 for the second factor, log (s_multiplier). Hence, the median/higher percentiles for s_multiplier are guaranteed to be at least 1. However, the lower percentiles may be less than 1, implying that s_total<s_base in such cases. In order to address this, at operation 1406, for percentiles lower than the 50th percentile, p'_r(log(s_multiplier)=max(0, p_r(log(s_multiplier)) is taken.

At operation 1408, the percentiles fors total may be computed as follows:

$p$_$r$($s$_total)=$p$_$r$($s$_base)*$p'$_$r$($s$_multiplier)

Figure 15:
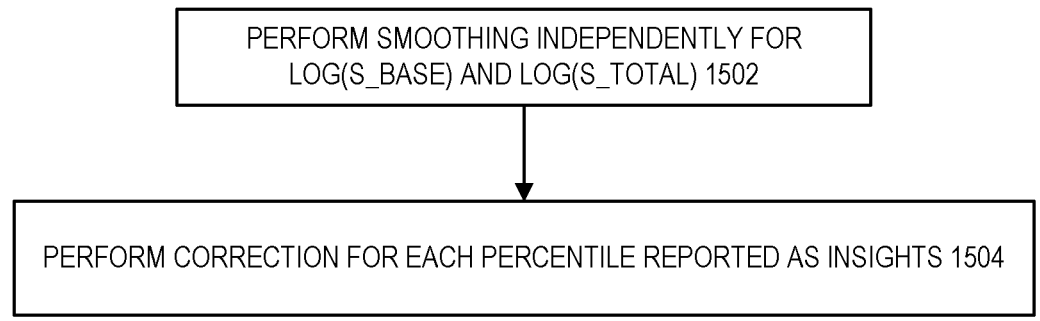
FIG. 15 is a flow diagram illustrating a method for post-processing consistency correction in accordance with an example embodiment.

The second approach is known as the post-processing consistency correction approach. FIG. 15 is a flow diagram illustrating a method 1500 for post-processing consistency correction in accordance with an example embodiment. At operation 1502, smoothing is performed independently for log (s_base) and log(s_total), thereby obtaining the corresponding posterior smoothed distributions. At operation 1504, for each percentile that is reported as insights, the following correction can be performed: p_r(s_total)⇐max (p_r(s_total), p_r(s_base)).

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-15 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of Things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 16:
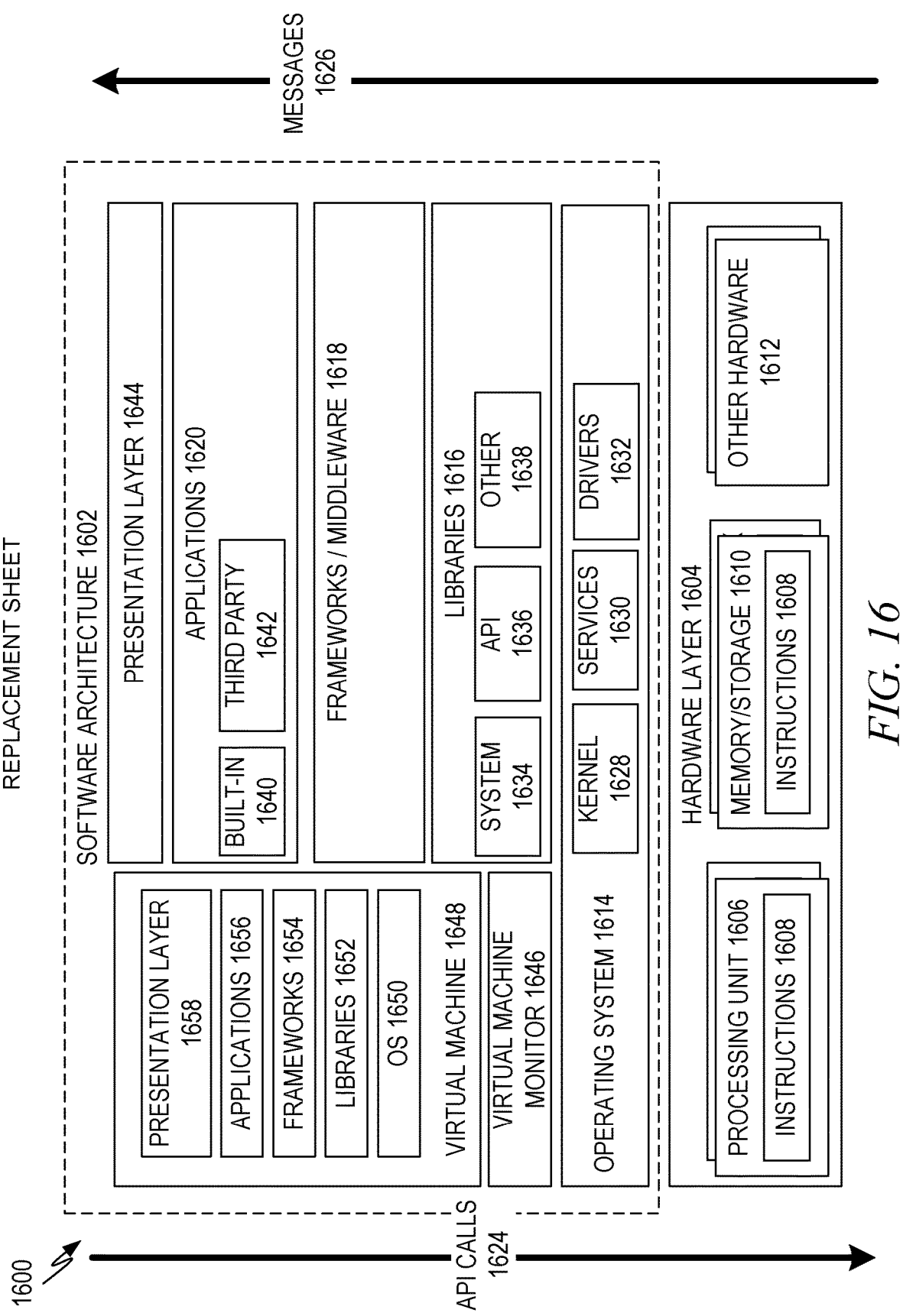
FIG. 16 is a block diagram illustrating a representative software architecture, which may be used in conjunction with various hardware architectures herein described.

FIG. 16 is a block diagram 1600 illustrating a representative software architecture 1602, which may be used in conjunction with various hardware architectures herein described. FIG. 16 is merely a non-limiting example of a software architecture, and it will be appreciated that many other architectures may be implemented to facilitate the functionality described herein. The software architecture 1602 may be executing on hardware such as a machine 1700 of FIG. 17 that includes, among other things, processors 1710, memory/storage 1730, and I/O components 1750. A representative hardware layer 1604 is illustrated and can represent, for example, the machine 1700 of FIG. 17. The representative hardware layer 1604 comprises one or more processing units 1606 having associated executable instructions 1608. The executable instructions 1608 represent the executable instructions of the software architecture 1602, including implementation of the methods, modules, and so forth of FIGS. 1-15. The hardware layer 1604 also includes memory and/or storage modules 1610, which also have the executable instructions 1608. The hardware layer 1604 may also comprise other hardware 1612, which represents any other hardware of the hardware layer 1604, such as the other hardware illustrated as part of the machine 1700.

In the example architecture of FIG. 16, the software architecture 1602 may be conceptualized as a stack of layers where each layer provides particular functionality. For example, the software architecture 1602 may include layers such as an operating system 1614, libraries 1616, frameworks/middleware 1618, applications 1620, and a presentation layer 1644. Operationally, the applications 1620 and/or other components within the layers may invoke API calls 1624 through the software stack and receive responses, returned values, and so forth, illustrated as messages 1626, in response to the API calls 1624. The layers illustrated are representative in nature and not all software architectures have all layers. For example, some mobile or special-purpose operating systems may not provide a layer of frameworks/middleware 1618, while others may provide such a layer. Other software architectures may include additional or different layers.

The operating system 1614 may manage hardware resources and provide common services. The operating system 1614 may include, for example, a kernel 1628, services 1630, and drivers 1632. The kernel 1628 may act as an abstraction layer between the hardware and the other software layers. For example, the kernel 1628 may be responsible for memory management, processor management (e.g., scheduling), component management, networking, security settings, and so on. The services 1630 may provide other common services for the other software layers. The drivers 1632 may be responsible for controlling or interfacing with the underlying hardware. For instance, the drivers 1632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1616 may provide a common infrastructure that may be utilized by the applications 1620 and/or other components and/or layers. The libraries 1616 typically provide functionality that allows other software modules to perform tasks in an easier fashion than by interfacing directly with the underlying operating system 1614 functionality (e.g., kernel 1628, services 1630, and/or drivers 1632). The libraries 1616 may include system libraries 1634 (e.g., C standard library) that may provide functions such as memory allocation functions, string manipulation functions, mathematical functions, and the like. In addition, the libraries 1616 may include API libraries 1636 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1616 may also include a wide variety of other libraries 1638 to provide many other APIs to the applications 1620 and other software components/modules.

The frameworks 1618 (also sometimes referred to as middleware) may provide a higher-level common infrastructure that may be utilized by the applications 1620 and/or other software components/modules. For example, the frameworks 1618 may provide various graphic user interface (GUI) functions, high-level resource management, high-level location services, and so forth. The frameworks 1618 may provide a broad spectrum of other APIs that may be utilized by the applications 1620 and/or other software components/modules, some of which may be specific to a particular operating system or platform.

The applications 1620 include built-in applications 1640 and/or third-party applications 1642. Examples of representative built-in applications 1640 may include, but are not limited to, a contacts application, a browser application, a book reader application, a location application, a media application, a messaging application, and/or a game application. The third-party applications 1642 may include any of the built-in applications 1640 as well as a broad assortment of other applications. In a specific example, the third-party application 1642 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1642 may invoke the API calls 1624 provided by the mobile operating system such as the operating system 1614 to facilitate functionality described herein.

The applications 1620 may utilize built-in operating system 1614 functions (e.g., kernel 1628, services 1630, and/or drivers 1632), libraries 1616 (e.g., system libraries 1634, API libraries 1636, and other libraries 1638), and frameworks/middleware 1618 to create user interfaces to interact with users of the system. Alternatively, or additionally, in some systems, interactions with a user may occur through a presentation layer, such as the presentation layer 1644. In these systems, the application/module "logic" can be separated from the aspects of the application/module that interact with a user.

Some software architectures utilize virtual machines. In the example of FIG. 16, this is illustrated by a virtual machine 1648. A virtual machine creates a software environment where applications/modules can execute as if they were executing on a hardware machine (such as the machine 1700 of FIG. 17, for example). A virtual machine is hosted by a host operating system (e.g., operating system 1614 in FIG. 16) and typically, although not always, has a virtual machine monitor 1646, which manages the operation of the virtual machine 1648 as well as the interface with the host operating system (e.g., operating system 1614). A software architecture executes within the virtual machine 1648, such as an operating system 1650, libraries 1652, frameworks/middleware 1654, applications 1656, and/or a presentation layer 1658. These layers of software architecture executing within the virtual machine 1648 can be the same as corresponding layers previously described or may be different.

Example Machine Architecture and Machine-Readable Medium

Figure 17:
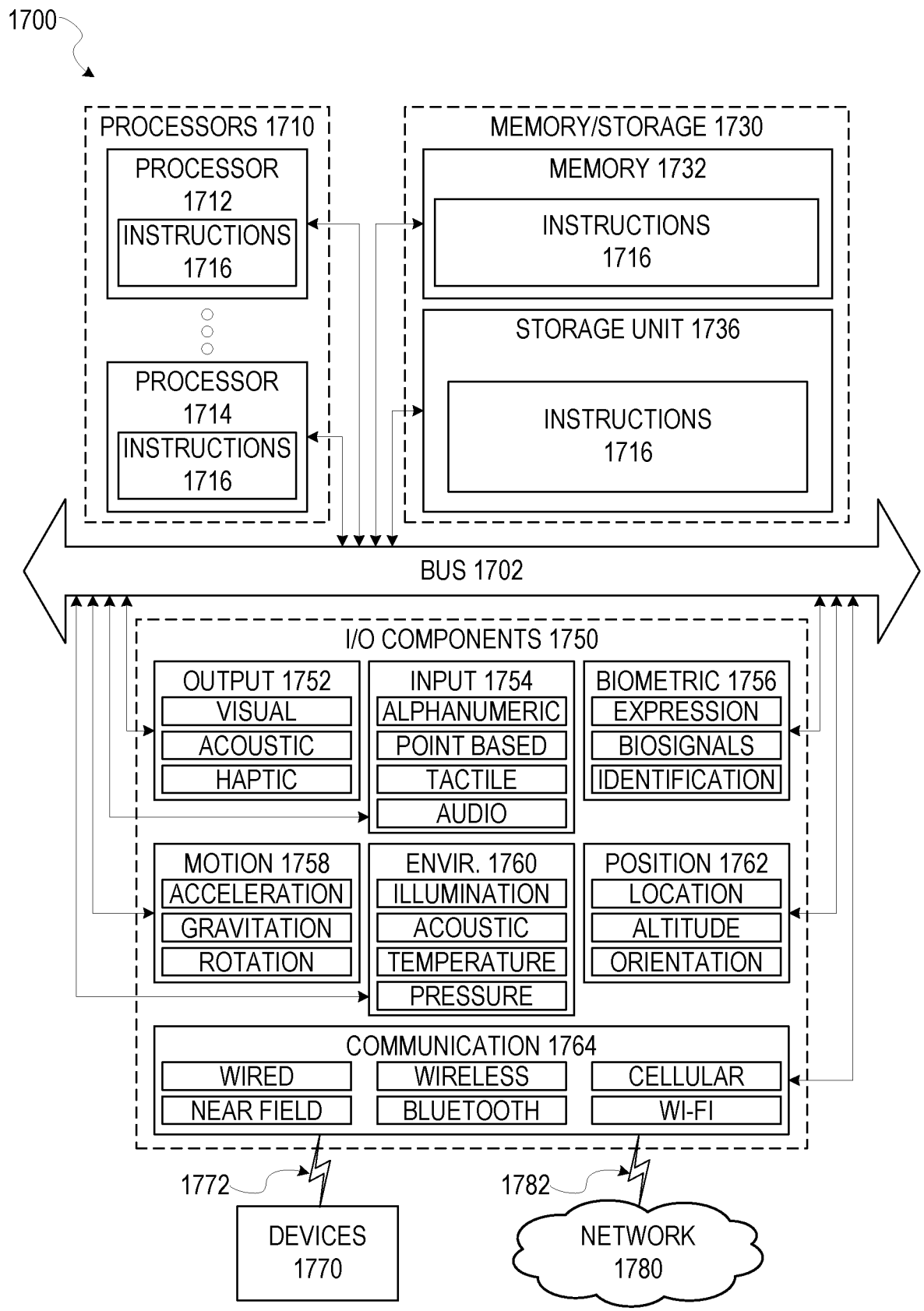
FIG. 17 is a block diagram illustrating components of a machine, according to some example embodiments, able to read instructions from a machine-readable medium (e.g., a machine-readable storage medium) and perform any one or more of the methodologies discussed herein.

FIG. 17 is a block diagram illustrating components of a machine 1700, according to some example embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein may be executed. The instructions 1716 transform the general, non-programmed machine into a particular machine programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any one or more of the methodologies discussed herein.

The machine 1700 may include processors 1710, memory/storage 1730, and I/O components 1750, which may be configured to communicate with each other such as via a bus 1702. In an example embodiment, the processors 1710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1712 and a processor 1714 that may execute the instructions 1716. The term "processor" is intended to include multi-core processors that may comprise two or more independent processors (sometimes referred to as "cores") that may execute the instructions 1716 contemporaneously. Although FIG. 17 shows multiple processors 1710, the machine 1700 may include a single processor with a single core, a single processor with multiple cores (e.g., a multi-core processor), multiple processors with a single core, multiple processors with multiples cores, or any combination thereof.

The memory/storage 1730 may include a memory 1732, such as a main memory, or other memory storage, and a storage unit 1736, both accessible to the processors 1710 such as via the bus 1702. The storage unit 1736 and memory 1732 store the instructions 1716 embodying any one or more of the methodologies or functions described herein. The instructions 1716 may also reside, completely or partially, within the memory 1732, within the storage unit 1736, within at least one of the processors 1710 (e.g., within the processor's cache memory), or any suitable combination thereof, during execution thereof by the machine 1700.

Accordingly, the memory 1732, the storage unit 1736, and the memory of the processors 1710 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1716. The term "machine-readable medium" shall also be taken to include any medium, or combination of multiple media, that is capable of storing instructions (e.g., instructions 1716) for execution by a machine (e.g., machine 1700), such that the instructions, when executed by one or more processors of the machine (e.g., processors 1710), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1750 may include a wide variety of components to receive input, provide output, produce output, transmit information, exchange information, capture measurements, and so on. The specific I/O components 1750 that are included in a particular machine will depend on the type of machine. For example, portable machines such as mobile phones will likely include a touch input device or other such input mechanisms, while a headless server machine will likely not include such a touch input device. It will be appreciated that the I/O components 1750 may include many other components that are not shown in FIG. 17. The I/O components 1750 are grouped according to functionality merely for simplifying the following discussion and the grouping is in no way limiting. In various example embodiments, the I/O components 1750 may include output components 1752 and input components 1754. The output components 1752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1750 may include biometric components 1756, motion components 1758, environmental components 1760, or position components 1762, among a wide array of other components. For example, the biometric components 1756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1758 may include acceleration sensor components (e.g., accelerometer), gravitation sensor components, rotation sensor components (e.g., gyroscope), and so forth. The environmental components 1760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1750 may include communication components 1764 operable to couple the machine 1700 to a network 1780 or devices 1770 via a coupling 1782 and a coupling 1772, respectively. For example, the communication components 1764 may include a network interface component or other suitable device to interface with the network 1780. In further examples, the communication components 1764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1770 may be another machine or any of a wide variety of peripheral devices (e.g., a peripheral device coupled via a USB).

Moreover, the communication components 1764 may detect identifiers or include components operable to detect identifiers. For example, the communication components 1764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1764, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1780 or a portion of the network 1780 may include a wireless or cellular network and the coupling 1782 may be a Code Division Multiple Access (CDMA) connection, a Global System for Mobile communications (GSM) connection, or another type of cellular or wireless coupling. In this example, the coupling 1782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1716 may be transmitted or received over the network 1780 using a transmission medium via a network interface device (e.g., a network interface component included in the communication components 1764) and utilizing any one of a number of well-known transfer protocols (e.g., Hypertext Transfer Protocol (HTTP)). Similarly, the instructions 1716 may be transmitted or received using a transmission medium via the coupling 1772 (e.g., a peer-to-peer coupling) to the devices 1770. The term "transmission medium" shall be taken to include any intangible medium that is capable of storing, encoding, or carrying the instructions 1716 for execution by the machine 1700, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising: a non-transitory computer-readable medium having instructions stored thereon, which, when executed by a processor, cause the system to: obtain a set of a plurality of cohort types and an anonymized set of confidential data values for a plurality of cohorts belonging to cohort types in the set of cohort types, the confidential data value received by the computer system via a first computerized user interface implemented as a screen of a graphical user interface with each piece of confidential data entered into a field of the screen of the graphical user interface; determine, from a set of candidate data transformations, a best fitting data transformation for the anonymized set of confidential data values, the best fitting data transformation being the transformation that produces a plot that is closest to a straight line across a diagonal; transform the anonymized set of confidential data values using the best fitting data transformation; compute optimal smoothing parameters separately for each of the plurality of cohort types, the optimal smoothing parameters being smoothing parameters that, when used to compute a posterior distribution, maximize log likelihood of observing a set of data; for each cohort in the set of cohort types having a small sample size, a small sample size being a sample size less than a predetermined threshold: determine a best parent for the cohort from a set of a plurality of parents for the cohort, each parent being a cohort having the cohort as a subset, the best parent being the parent that provides an argmax of a log-likelihood of a given function based on mean and variance of confidential data values in the parent; and determine a posterior distribution for the cohort based on the best parent for the cohort and the optimal smoothing parameters for a cohort type for the cohort.

2. The system of claim 1, wherein the set of candidate data transformations includes identity, log, and square root transformations.

3. The system of claim 1, wherein the set of candidate data transformations includes monotonic transformations.

4. The system of claim 1, wherein the determining a best fitting data transformation includes:

for each candidate data transformation in the set of candidate data transformations:
applying the candidate data transformation to the anonymized set of confidential data values;
generating a quantile-quantile plot of the transformed confidential data values; and
selecting the candidate data transformation having the quantile-quantile plot that is closest to a straight line across a diagonal as the best fitting data transformation.

5. The system of claim 1, wherein the confidential data values are compensation values.

6. The system of claim 1, wherein the determining a best parent includes computing a mean and variance that provides a maximum of log-likelihood as a prior for smoothing of percentiles in the cohort.

7. The system of claim 1, wherein the computing the optimal smoothing parameters for each cohort type includes:
randomly partitioning a set of all observed entries in each cohort into a training set and a hold-out set;
generating a smoothed posterior log-normal distribution based on the training data; and
computing the log likelihood of a mean and variance as per the smoothed posterior log-normal distribution.

8. A computerized method comprising:
obtaining a set of a plurality of cohort types and an anonymized set of confidential data values for a plurality of cohorts belonging to cohort types in the set of cohort types, the confidential data value received by the computer system via a first computerized user interface implemented as a screen of a graphical user interface with each piece of confidential data entered into a field of the screen of the graphical user interface;
determining, from a set of candidate data transformations, a best fitting data transformation for the anonymized set of confidential data values, the best fitting data transformation being the transformation that produces a plot that is closest to a straight line across a diagonal;
transforming the anonymized set of confidential data values using the best fitting data transformation;
computing optimal smoothing parameters separately for each of the plurality of cohort types, the optimal smoothing parameters being smoothing parameters that, when used to compute a posterior distribution, maximize log likelihood of observing a set of data;
for each cohort in the set of cohort types having a small sample size, a small sample size being a sample size less than a predetermined threshold:
determining a best parent for the cohort from a set of a plurality of parents for the cohort, each parent being a cohort having the cohort as a subset, the best parent being the parent that provides an argmax of a log-likelihood of a given function based on mean and variance of confidential data values in the parent; and
determining a posterior distribution for the cohort based on the best parent for the cohort and the optimal smoothing parameters for a cohort type for the cohort.

9. The computerized method of claim 8, wherein the set of candidate data transformations includes identity, log, and square root transformations.

10. The computerized method of claim 8, wherein the set of candidate data transformations includes monotonic transformations.

11. The computerized method of claim 8, wherein the determining a best fitting data transformation includes:
for each candidate data transformation in the set of candidate data transformations:

applying the candidate data transformation to the anonymized set of confidential data values;

generating a quantile-quantile plot of the transformed confidential data values; and selecting the candidate data transformation having the quantile-quantile plot that is closest to a straight line across a diagonal as the best fitting data transformation.

12. The computerized method of claim 8, wherein the confidential data values are compensation values.

13. The computerized method of claim 8, wherein the determining a best parent includes computing a mean and variance that provides a maximum of log-likelihood as a prior for smoothing of percentiles in the cohort.

14. The computerized method of claim 1, wherein the computing the optimal smoothing parameters for each cohort type includes:

randomly partitioning a set of all observed entries in each cohort into a training set and a hold-out set;

generating a smoothed posterior log-normal distribution based on the training data; and computing the log likelihood of a mean and variance as per the smoothed posterior log-normal distribution.

15. A non-transitory machine-readable storage medium comprising instructions, which when implemented by one or more machines, cause the one or more machines to perform operations comprising:

obtaining a set of a plurality of cohort types and an anonymized set of confidential data values for a plurality of cohorts belonging to cohort types in the set of cohort types, the confidential data value received by the computer system via a first computerized user interface implemented as a screen of a graphical user interface with each piece of confidential data entered into a field of the screen of the graphical user interface;

determining, from a set of candidate data transformations, a best fitting data transformation for the anonymized set of confidential data values, the best fitting data transformation being the transformation that produces a plot that is closest to a straight line across a diagonal;

transforming the anonymized set of confidential data values using the best fitting data transformation;

computing optimal smoothing parameters separately for each of the plurality of cohort types, the optimal smoothing parameters being smoothing parameters that, when used to compute a posterior distribution, maximize log likelihood of observing a set of data;

for each cohort in the set of cohort types having a small sample size, a small sample size being a sample size less than a predetermined threshold:

determining a best parent for the cohort from a set of a plurality of parents for the cohort, each parent being a cohort having the cohort as a subset, the best parent being the parent that provides an argmax of a log-likelihood of a given function based on mean and variance of confidential data values in the parent; and determining a posterior distribution for the cohort based on the best parent for the cohort and the optimal smoothing parameters for a cohort type for the cohort.

16. The non-transitory machine-readable storage medium of claim 15, wherein the set of candidate data transformations includes identity, log, and square root transformations.

17. The non-transitory machine-readable storage medium of claim 15, wherein the set of candidate data transformations includes monotonic transformations.

18. The non-transitory machine-readable storage medium of claim 15, wherein the determining a best fitting data transformation includes:

for each candidate data transformation in the set of candidate data transformations:

applying the candidate data transformation to the anonymized set of confidential data values;

generating a quantile-quantile plot of the transformed confidential data values; and selecting the candidate data transformation having the quantile-quantile plot that is closest to a straight line across a diagonal as the best fitting data transformation.

19. The non-transitory machine-readable storage medium of claim 15, wherein the confidential data values are compensation values.

20. The non-transitory machine-readable storage medium of claim 15, wherein the determining a best parent includes computing a mean and variance that provides a maximum of log-likelihood as a prior for smoothing of percentiles in the cohort.

* * * * *